· US010567201B2

(12) United States Patent
Wang et al.

(10) Patent No.: US 10,567,201 B2
(45) Date of Patent: Feb. 18, 2020

(54) INFORMATION TRANSMISSION METHOD AND APPARATUS

(71) Applicant: ZTE Corporation, Shenzhen, Guangdong (CN)

(72) Inventors: Yuxin Wang, Guangdong (CN); Chuangxin Jiang, Guangdong (CN); Shujuan Zhang, Guangdong (CN); Zhaohua Lu, Guangdong (CN); Yu Ngok Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/407,167

(22) Filed: May 8, 2019

(65) Prior Publication Data
US 2019/0268185 A1 Aug. 29, 2019

Related U.S. Application Data

(63) Continuation of application No. PCT/CN2018/101813, filed on Aug. 22, 2018.

(30) Foreign Application Priority Data

Sep. 30, 2017 (CN) .......................... 2017 1 0939835

(51) Int. Cl.
H04L 25/02 (2006.01)
H04L 5/00 (2006.01)
(Continued)

(52) U.S. Cl.
CPC ......... *H04L 25/0226* (2013.01); *H04B 1/713* (2013.01); *H04L 5/0048* (2013.01);
(Continued)

(58) Field of Classification Search
None
See application file for complete search history.

(56) References Cited

U.S. PATENT DOCUMENTS

2009/0238241 A1* 9/2009 Hooli ................... H04B 1/7143
375/133
2011/0013546 A1* 1/2011 Hao ....................... H04L 5/0007
370/294
(Continued)

FOREIGN PATENT DOCUMENTS

| CN | 102986275 A | 3/2013 |
| CN | 106411375 A | 2/2017 |
| CN | 108111282 A | 6/2018 |

OTHER PUBLICATIONS

Huawei, "Coexistence of different UE types on a wideband carver," 3GPP TSG RAN WG1 Meeting #90, Prague, Czech Republic, R1-1713733, 6 pages, Aug. 2017.
(Continued)

*Primary Examiner* — Eunsook Choi
(74) *Attorney, Agent, or Firm* — Perkins Coie LLP

(57) ABSTRACT

Disclosed is an information transmission method. The method includes that: a first communication node determines a resource or parameter for a second communication node to transmit a reference signal, and indicates the resource or parameter to the second communication node through signaling; and the second communication node receives the signaling transmitted by the first communication node, determines the resource or parameter for transmitting the reference signal based on the signaling or based on the signaling and a rule predefined by the first communication node and the second communication node, and uses the determined resource or parameter to transmit the reference signal.

18 Claims, 12 Drawing Sheets

A first communication node determines a resource or parameter for a second communication node to transmit a reference signal ⟶ S101

⬇

The resource or parameter is indicated to the second communication node through signaling ⟶ S102

(51) Int. Cl.
 H04B 1/713 (2011.01)
 H04L 27/26 (2006.01)
(52) U.S. Cl.
 CPC .......... *H04L 5/0051* (2013.01); *H04L 5/0053* (2013.01); *H04L 27/2605* (2013.01); *H04L 27/2613* (2013.01)

(56) References Cited

U.S. PATENT DOCUMENTS

| | | | |
|---|---|---|---|
| 2013/0156014 A1* | 6/2013 | Kim | H04L 5/0051 370/336 |
| 2016/0219534 A1* | 7/2016 | Hao | H04W 52/325 |
| 2017/0280441 A1* | 9/2017 | Shimezawa | H04W 52/44 |
| 2019/0037601 A1* | 1/2019 | Noh | H04L 27/26 |
| 2019/0150170 A1* | 5/2019 | Park | H04W 72/1268 |
| 2019/0207731 A1* | 7/2019 | Park | H04L 5/0048 |

OTHER PUBLICATIONS

International Search Report and Written Opinion dated Sep. 30, 2018 for International Application No. PCT/CN2018/101813, filed on Aug. 22, 2018 (10 pages).

* cited by examiner

INFORMATION TRANSMISSION METHOD AND APPARATUS

CROSS REFERENCE TO RELATED APPLICATIONS

This patent document is a continuation of and claims priority to International Patent Application No. PCT/CN2018/101813, filed on Aug. 22, 2018, which claims the benefit of priority of Chinese Patent Application No. 201710939835.7, filed Sep. 30, 2017. The entire contents of the before-mentioned patent applications are incorporated by reference as part of the disclosure of this application.

TECHNICAL FIELD

The present disclosure relates to, but is not limited to, the field of communications.

BACKGROUND

In Long Term Evolution (LTE for short), a physical downlink control channel (PDCCH for short) is used for bearing uplink and downlink scheduling information and uplink power control information. The downlink control information (DCI for short) formats includes DCI formats 0, 1, 1A, 1B, 1C, 1D, 2, 2A, 3, 3A, etc. And later DCI formats 2B, 2C, and 2D are added to an evolved LTE-A Release 12 to support a variety of different applications and transmission modes. A base station (e-Node-B, eNB for short) may configure a user equipment (UE for short) through the downlink control information, or the UE is configured by the high-layer, which is also referred to as being configured with the high-layer signaling.

A sounding reference signal (SRS for short) is a signal used between the UE and the eNB for measuring radio channel state information (CSI for short). In the LTE system, the UE periodically transmits an uplink SRS on the last data symbol of a transmission subframe according to parameters, indicated by the eNB, such as a frequency band, a frequency domain position, a sequence cyclic shift, a period, and a subframe offset. The eNB determines the uplink CSI of the UE according to the received SRS, and performs operations such as frequency domain selection scheduling, closed loop power control according to the obtained CSI.

In a study of LTE-A Release 10 (LTE-A Release 10), it is proposed that in uplink communication, a non-precoded SRS, that is, an antenna-specific SRS should be used, while a demodulation reference signal (DMRS for short) used for demodulation in a physical uplink shared channel (PUSCH for short) is precoded. The eNB can estimate original uplink CSI by receiving the non-precoded SRS, while can not estimate the original uplink CSI through the precoded DMRS. At this time, when the UE transmits the non-precoded SRS by using multiple antennas, more SRS resources are required by each UE, which results in a decrease in the number of UEs that can be simultaneously reused in the system. The UE can transmit the SRS in two triggering manners, that is, through the high-layer signaling (also referred to as the trigger type 0) or the downlink control information (also referred to as the trigger type 1). A periodic SRS is triggered based on the high-layer signaling, and a non-periodic SRS is triggered based on the downlink control information. In LTE-A Release 10, a manner of a non-periodic transmission of SRS is added, which improves the utilization rate of SRS resources to some extent and improves the flexibility of resource scheduling.

With the development of communication technologies, the demand for data services is increasing and available low-frequency carriers are in short supply. Therefore, high-frequency (30 GHz to 300 GHz) carrier communication which has not been fully utilized has become an important communication way of achieving high-speed data communication in the future. The high-frequency carrier communication has a large available bandwidth and can provide effective high-speed data communication. However, a big technical challenge for the high-frequency carrier communication is that high-frequency signals are attenuated significantly in space compared with low-frequency signals. Although this will cause spatial attenuation losses when the high-frequency signals are used for outdoor communication, the shorter wavelength of the high-frequency signals usually allows using more antennas. Therefore, the communication is implemented based on beams to compensate the spatial attenuation losses.

However, when the number of antennas increases, each antenna needs a set of radio frequency links, and digital beamforming thus brings about an increase in costs and a loss in power. Therefore, current studies tend to hybrid beamforming, that is, a final beam formed by radio frequency beams together with digital beams.

In a study of the new radio access technology (NR for short), for the high-frequency communication system, the eNB is configured with a large number of antennas to form downlink transmission beams for compensating the spatial attenuation of the high-frequency communication, and the UE is also configured with a large number of antennas to form uplink transmission beams. At this time, the SRS is also transmitted in the form of a beam. In a future study of the new radio access technology, the eNB may configure different bandwidth parts (BWP for short) for each user, and the bandwidth occupied by the BWP of a user may be larger than the 20 MHz bandwidth of the LTE or LTE-A system. The current SRS bandwidth configuration only supports 20 MHz at most, which cannot meet the design requirements of NR. In addition, how to determine a frequency domain starting position of the SRS and how to achieve an antenna switching of the SRS are also problems to be solved in the SRS design of NR.

SUMMARY

The following is a summary of the subject matter described herein in detail. This summary is not intended to limit the scope of the claims.

Embodiments of the present application provide an information transmission method and apparatus for implementing configuration of a reference signal transmission in a NR system.

In a first aspect, an embodiment of the present application provides an information transmission method, including:

determining, by a first communication node, a resource or parameter for a second communication node to transmit a reference signal; and indicating the resource or parameter to the second communication node through signaling.

In a second aspect, an embodiment of the present application provides an information transmission method, including:

receiving, by a second communication node, signaling transmitted by a first communication node;

determining, a resource or parameter for transmitting a reference signal based on the signaling or based on the signaling and a rule predefined by the first communication node and the second communication node; and using the resource or parameter to transmit the reference signal.

In a third aspect, an embodiment of the present application provides an information transmission method, including:

determining, by a first communication node, a first-level parameter and a second-level parameter of a reference signal resource, where the first-level parameter includes at least one of: the number N1 of time domain symbols continuously transmitted by a reference signal in a same frequency domain unit, an antenna switching switch function A1 of the reference signal, or a frequency hopping switch function B1; and the second-level parameter includes at least one of: the number N2 of time domain symbols continuously transmitted by an antenna port group of the reference signal, an antenna switching switch function A2 of the reference signal in a time domain unit, or a frequency hopping switch function B2 of the reference signal in a time domain unit; and receiving, by the first communication node, the reference signal according to the first-level parameter and the second-level parameter.

In a fourth aspect, an embodiment of the present application provides an information transmission method, including:

determining, by a second communication node, a first-level parameter and a second-level parameter of a reference signal resource, where the first-level parameter includes at least one of: the number N1 of time domain symbols continuously transmitted by a reference signal in a same frequency domain unit, an antenna switching switch function A1 of the reference signal, or a frequency hopping switch function B1; and the second-level parameter includes at least one of: the number N2 of time domain symbols continuously transmitted by an antenna port group of the reference signal, an antenna switching switch function A2 of the reference signal in a time domain unit, or a frequency hopping switch function B2 of the reference signal in a time domain unit; and transmitting, by the second communication node, the reference signal according to the first-level parameter and the second-level parameter.

In a fifth aspect, an embodiment of the present application provides an information transmission apparatus, applied to a first communication node, including:

a first processing module, which is configured to determine a resource or parameter for a second communication node to transmit a reference signal; and a first transmitting module, which is configured to indicate the resource or parameter to the second communication node through signaling.

In a sixth aspect, an embodiment of the present application provides an information transmission apparatus, applied to a second communication node, including:

a first receiving module, which is configured to receive signaling transmitted by a first communication node;

a second processing module, which is configured to determine a resource or parameter for transmitting a reference signal based on the signaling or based on the signaling and a rule predefined by the first communication node and the second processing module; and a second transmitting module, which is configured to use the resource or parameter to transmit the reference signal.

In a seventh aspect, an embodiment of the present application provides an information transmission apparatus, applied to a first communication node, including:

a third processing module, which is configured to determine a first-level parameter and a second-level parameter of a reference signal resource, where the first-level parameter includes at least one of: the number N1 of time domain symbols continuously transmitted by a reference signal in a same frequency domain unit, an antenna switching switch function A1 of the reference signal, or a frequency hopping switch function B1; and the second-level parameter includes at least one of: the number N2 of time domain symbols continuously transmitted by an antenna port group of the reference signal, an antenna switching switch function A2 of the reference signal in a time domain unit, or a frequency hopping switch function B2 of the reference signal in a time domain unit; and a second receiving module, which is configured to receive the reference signal according to the first-level parameter and the second-level parameter.

In an eighth aspect, an embodiment of the present application provides an information transmission apparatus, applied to a second communication node, including:

a fourth processing module, which is configured to determine a first-level parameter and a second-level parameter of a reference signal resource, where the first-level parameter includes at least one of: the number N1 of time domain symbols continuously transmitted by a reference signal in a same frequency domain unit, an antenna switching switch function A1 of the reference signal, or a frequency hopping switch function B1; and the second-level parameter includes at least one of: the number N2 of time domain symbols continuously transmitted by an antenna port group of the reference signal, an antenna switching switch function A2 of the reference signal in a time domain unit, or a frequency hopping switch function B2 of the reference signal in a time domain unit; and a third transmitting module, which is configured to transmit the reference signal according to the first-level parameter and the second-level parameter.

In a ninth aspect, an embodiment of the present application provides a communication node, including: a first memory and a first processor, where the first memory is configured to store information transmission programs which, when executed by the first processor, implement the steps of the information transmission method described in the first aspect.

In a tenth aspect, an embodiment of the present application provides a communication node, including: a second memory and a second processor, where the second memory is configured to store information transmission programs which, when executed by the second processor, implement the steps of the information transmission method described in the second aspect.

In an eleventh aspect, an embodiment of the present application provides a communication node, including: a third memory and a third processor, where the third memory is configured to store information transmission programs which, when executed by the third processor, implement the steps of the information transmission method described in the third aspect.

In a twelfth aspect, an embodiment of the present application provides a communication node, including: a fourth memory and a fourth processor, where the fourth memory is configured to store information transmission programs which, when executed by the fourth processor, implement the steps of the information transmission method described in the fourth aspect.

In addition, an embodiment of the present application further provides a computer-readable medium, which is configured to store information transmission programs which, when executed by a processor, implement the steps of the information transmission method described in any one of the first to the fourth aspect.

In the embodiment of the present application, a first communication node determines a resource or parameter for a second communication node to transmit a reference signal, and indicates the resource or parameter to the second communication node through signaling. The second communication node receives the signaling transmitted by the first communication node, and determines the resource or parameter for transmitting the reference signal based on the signaling or based on the signaling and a rule predefined by the first communication node and the second communication node. In this way, design requirements for the reference signal transmission in the NR system are achieved.

In the embodiment of the present application, the first communication node receives the reference signal according to the parameters of two levels of the reference signal resource, and the second communication node transmits the reference signal according to the parameters of two levels of the reference signal resource. Through the configuration of parameters of two levels, the antenna switching and frequency hopping control of the reference signal in the NR system are achieved.

Other aspects can be understood after the drawings and detailed description are read and understood.

DETAILED DESCRIPTION

Embodiments of the present application will be described in detail in conjunction with the drawings, and it should be understood that the embodiments described hereinafter are intended to describe and explain the present application and not to limit the present application.

The steps illustrated in the flowcharts of the drawings may be executed by, for example, a set of computer-executable instructions in a computer system. Although the flowcharts illustrate a logical order of execution, the steps illustrated or described may, in some cases, be executed in a different order from the one illustrated or described herein.

Figure 1:
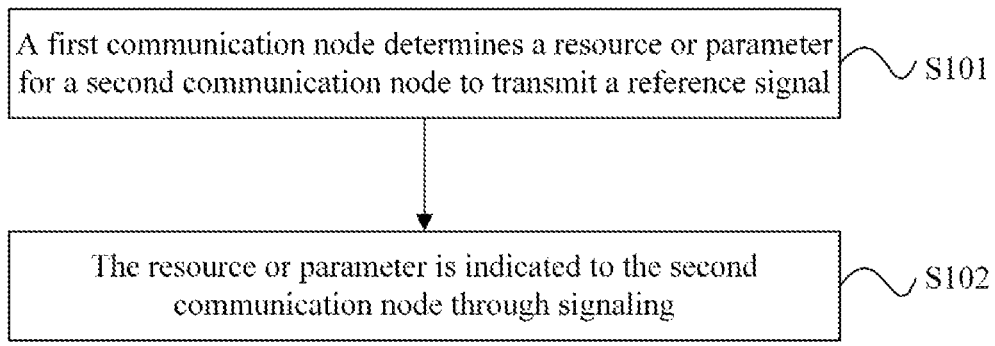
FIG. 1 is a flowchart of an information transmission method according to an embodiment of the present application.

FIG. 1 is a flowchart of an information transmission method according to an embodiment of the present application. As illustrated in FIG. 1, the information transmission method in the embodiment may include the steps described below.

In S101, a first communication node determines a resource or parameter for a second communication node to transmit a reference signal.

In S102, the resource or parameter is indicated to the second communication node through signaling.

In the embodiment, the first communication node refers to a node configured to determine a transmission mode of the second communication node and to perform signaling indication to the second communication node, and the second communication node refers to a node configured to receive the signaling. In an implementation mode, the first communication node may be nodes such as a base station of a macro cell, a base station or transmission node of a small cell, a sending node in a high-frequency communication system, or a sending node in an Internet of Things system, and the second communication node may be nodes in a communication system such as a UE, a mobile phone, a portable device, or a car. In another implementation mode, the base station of a macro cell, the base station or transmission node of a small cell, the sending node in a high-frequency communication system, the sending node in an Internet of Things system, or the like may serve as the second communication node, and the UE may serve as the first communication node.

In the embodiment, the signaling may include at least one of: radio resource control (RRC) signaling, media access control control element (MAC CE) signaling, physical downlink control signaling, or physical layer dynamic control signaling.

In the embodiment, the reference signal includes one of: a SRS, an uplink demodulation reference signal, a downlink demodulation reference signal, a downlink channel state information reference signal (CSI-RS), an uplink phase tracking reference signal (PTRS), and a downlink PTRS.

In the embodiment, $N_{BWP}$ is the bandwidth value of the bandwidth part. $N_{BWP}^{UL}$ refers to an uplink bandwidth part, and $N_{BWP}^{DL}$ refers to a downlink bandwidth part.

In an exemplary implementation mode, the resource or parameter at least includes one or more of: a frequency domain starting position, a frequency domain end position, a transmission bandwidth, a number of segments, a bandwidth configuration index, a bandwidth parameter, a parameter indicating whether a resource is repeated or the same, an antenna port number or index, a calculation manner of a frequency domain starting position of a maximum bandwidth of the reference signal in a multi-level bandwidth structure, a parameter related to obtaining the frequency domain starting position of the maximum bandwidth of the reference signal in the multi-level bandwidth structure, or information of the multi-level bandwidth structure containing the reference signal.

In the embodiment, the number of segments has the same meaning as $N_0$, $N_1$, $N_2$, $N_3$ in the bandwidth configuration table 4a in LTE, or the number of segments may be defined as a ratio of a transmission bandwidth of a previous level to a transmission bandwidth of a current level in the tree structure bandwidth configuration of the reference signal.

In the embodiment, the reference signal may be transmitted in at least one of the following manners: a transmission beam, a transmission antenna, a transmission sector, a transmitting end precoding, an antenna port indication, an antenna weight vector indication, an antenna weight matrix indication, a space-division multiplexing mode, a frequency domain/time domain transmission diversity mode, a transmission sequence, the number of transmission layers, a transmission model, a modulation and coding mode, or a reference signal indication.

In the embodiment, the reference signal may be received in at least one of the following manners: a receiving beam; a receiving antenna; a receiving antenna panel; a receiving sector; a first beam resource corresponding manner, where the first beam resource is a beam resource, of the first communication node, indicated in a Quasi-Co-Location (QCL) of both the reference signal and an antenna port; or a second beam resource corresponding manner, where the second beam resource is a beam resource, of the first communication node, indicated in a QCL of both a base reference signal and the antenna port.

In an exemplary implementation mode, the step in which a first communication node determines a resource or parameter for a second communication node to transmit a reference signal may include that: the first communication node determines the resource or parameter for the second communication node to transmit the reference signal based on a rule predefined by the first communication node and the second communication node.

In an exemplary implementation mode, the step in which a first communication node determines a resource or parameter for a second communication node to transmit a reference signal includes at least one of the steps described below.

The first communication node determines a bandwidth configuration index actually used by the second communication node according to at least one of a bandwidth value or the bandwidth configuration index of a bandwidth part configured for the second communication node.

The first communication node determines a transmission bandwidth set of the reference signal according to the bandwidth configuration index of the reference signal.

The first communication node determines the transmission bandwidth or the number of segments of the reference signal according to at least one of the bandwidth value, the bandwidth configuration index or the bandwidth parameter of the bandwidth part configured for the second communication node.

In an exemplary implementation mode, the step in which the first communication node determines a bandwidth configuration index actually used by the second communication node according to at least one of a bandwidth value or the bandwidth configuration index of a bandwidth part configured for the second communication node includes the step described below.

Determining the bandwidth configuration index actually used by the second communication node includes at least one of:

(1) $4 \times \lfloor \frac{N_{BWP}}{4} \rfloor - C_{SRS}$;

(2) $8 \times \lfloor \frac{N_{BWP}}{8} \rfloor - C_{SRS}$;

(3) $12 \times \lfloor \frac{N_{BWP}}{12} \rfloor - C_{SRS}$;

(4) $16 \times \lfloor \frac{N_{BWP}}{16} \rfloor - C_{SRS}$;

or (5) when a maximum transmission bandwidth of the reference signal corresponding to the bandwidth configuration index is less than or equal to $$4 \times \lfloor \frac{N_{BWP}}{4} \rfloor \text{ or } 8 \times \lfloor \frac{N_{BWP}}{8} \rfloor \text{ or}$$
$$12 \times \lfloor \frac{N_{BWP}}{12} \rfloor \text{ or } 16 \times \lfloor \frac{N_{BWP}}{16} \rfloor,$$

selecting a maximum bandwidth configuration index and subtracting the maximum bandwidth configuration index by $C_{SRS}$ to obtain as the bandwidth configuration index actually used by the second communication node.

$\lfloor \ \rfloor$ is a round-down function, $N_{BWP}$ is the bandwidth value of the bandwidth part, $C_{SRS}$ is the bandwidth configuration index, and the first communication node configures $C_{SRS}$ and $N_{BWP}$ for the second communication node through the signaling.

In an exemplary implementation mode, the step in which the first communication node determines a transmission bandwidth set of the reference signal according to the bandwidth configuration index of the reference signal includes the step described below.

When the bandwidth configuration index of the reference signal is greater than or equal to 17, or the bandwidth configuration index of the reference signal is less than or equal to 14, or the bandwidth configuration index of the reference signal is an integer included in a range from 0 to 31 or from 0 to 63, determining the transmission bandwidth set includes at least one of:

(1) 108, 36, 12, 4;
(2) 112, 56, 28, 4;
(3) 112, 56, 8, 4;
(4) 120, 60, 20, 4;
(5) 120, 40, 20, 4;
(6) 128, 64, 32, 4;
(7) 128, 32, 16, 4;
(8) 128, 32, 8, 4;
(9) 136, 68, 4, 4;
(10) 144, 72, 24, 4;
(11) 144, 72, 36, 4;
(12) 144, 72, 12, 4;
(13) 144, 48, 24, 4;
(14) 144, 48, 12, 4;
(15) 144, 48, 16, 4;
(16) 144, 48, 8, 4;

(17) 160, 80, 40, 4;
(18) 160, 80, 20, 4;
(19) 160, 40, 20, 4;
(20) 160, 40, 8, 4;
(21) 168, 84, 28, 4;
(22) 176, 88, 44, 4;
(23) 180, 60, 20, 4;
(24) 192, 96, 32, 4;
(25) 192, 96, 48, 4;
(26) 192, 48, 24, 4;
(27) 192, 48, 16, 4;
(28) 192, 48, 12, 4;
(29) 200, 100, 20, 4;
(30) 200, 40, 20, 4;
(31) 200, 40, 8, 4;
(32) 208, 104, 52, 4;
(33) 216, 108, 36, 4;
(34) 240, 120, 60, 4;
(35) 240, 120, 40, 4;
(36) 240, 120, 20, 4;
(37) 240, 80, 40, 4;
(38) 240, 80, 20, 4;
(39) 240, 80, 8, 4;
(40) 256, 128, 64, 4;
(41) 256, 64, 32, 4;
(42) 256, 64, 16, 4;
(43) 256, 64, 8, 4; or
(44) 272, 136, 68, 4.

In an exemplary implementation mode, the step in which the first communication node determines the transmission bandwidth or the number of segments of the reference signal according to at least one of the bandwidth value, the bandwidth configuration index or the bandwidth parameter of the bandwidth part configured for the second communication node is performed in at least one of the following manners, or a transmission bandwidth set corresponding to one or more bandwidth configuration indexes satisfies one of the following relationships:

Manner 1:

Let $k_i = \text{floor}\left(\frac{(N_{BWP} - 4 \times C_{SRS})/4}{2^i}\right)$, then the transmission bandwidth is:

$m_{SRS,0} = 4 \times k_0$;

$m_{SRS,i+1} = \begin{cases} 4 \times k_{i+1}, & \text{if } ((N_{BWP} - 4 \times C_{SRS})/4)\text{mod}2^i = 0 \text{ and } k_i \in \text{Even} \\ 4, & \text{otherwise.} \end{cases}$ Manner 2:

Let $k_i = \text{floor}\left(\frac{(N_{BWP} - 4 \times C_{SRS})/4}{2^i}\right)$, then the transmission bandwidth is:

$m_{SRS,0} = 4 \times k_0$;

$m_{SRS,i+1} = \begin{cases} 4 \times k_{i+1}, & \text{if } \left(\frac{N_{BWP} - 4 \times C_{SRS}}{4}\right)\text{mod}2^i = 0 \text{ and } k_i \in \text{Even} \\ 4, & \text{otherwise.} \end{cases}$ Manner 3:
The number of segments is:

$N_0 = 1$;

$N_{i+1} = \begin{cases} 2, & \text{if } ((N_{BWP} - 4 \times C_{SRS})/4)\text{mod}2^i = 0 \text{ and } k_i \in \text{Even} \\ k_i, & \text{if } ((N_{BWP} - 4 \times C_{SRS})/4)\text{mod}2^i = 0 \text{ and } k_i \in \text{Odd} \\ 1, & \text{otherwise.} \end{cases}$ Manner 4:
The transmission bandwidth is $m_{SRS,i} = 4 \times \text{floor}\left(\frac{(N_{BWP} - 4 \times C_{SRS})/4}{2^i \times 3^i \times 5^i}\right)$; or $k_i = 4 \times \text{floor}\left(\frac{(N_{BWP} - 4 \times C_{SRS})/4}{2^i \times 3^i \times 5^i}\right)$.

Manner 5:
The transmission bandwidth is $m_{SRS,i} = \begin{cases} 16 \times \lfloor(N_{BWP} - 16 \times C_{SRS})/16\rfloor/2^i, & \text{if } i < 3 \\ 4, & \text{otherwise} \end{cases}$; or $m_{SRS,i} = \begin{cases} 16 \times \lfloor(N_{BWP} + 16 \times C_{SRS})/16\rfloor/2^i, & \text{if } i < 3 \\ 4, & \text{otherwise} \end{cases}$.

Manner 6:
The transmission bandwidth is $m_{SRS,i} = \begin{cases} 16 \times \lfloor(N_{BWP} - 16 \times C_{SRS})/16\rfloor/d_i, & \text{if } i < 3 \\ 4, & \text{otherwise} \end{cases}$; or $m_{SRS,i} = \begin{cases} 16 \times \lfloor(N_{BWP} + 16 \times C_{SRS})/16\rfloor/d_i, & \text{if } i < 3 \\ 4, & \text{otherwise} \end{cases}$.

$d_i$ is $2^i \times 3^j \times 5^l$, or $d_i$ is one or more integers in a range from 1 to 17, including 1 and 17, values of i, j and l are non-negative integers, $m_{SRS,i}$ is the transmission bandwidth of the reference signal, floor( ) is a round-down function, $\lfloor \ \rfloor$ is a round-down function, $i = B_{SRS}$, $B_{SRS}$ is the bandwidth parameter of the reference signal, $N_{BWP}$ is the bandwidth value of the bandwidth part, and the first communication node configures $B_{SRS}$ and $N_{BWP}$ for the second communication node through the signaling.

In an exemplary implementation mode, indicating the resource or parameter for the second communication node through signaling includes the step described below.

An offset value of a frequency domain starting position corresponding to a maximum bandwidth in a multi-level bandwidth structure containing the reference signal relative to a first frequency domain starting position is indicated to the second communication node through the signaling, where the first frequency domain starting position is obtained by the second communication node based on a rule predefined by the first communication node and the second communication node.

In an exemplary implementation mode, the calculation manner of a frequency domain starting position of a maximum bandwidth of the reference signal in a multi-level bandwidth structure includes at least one of:

(1) $\bar{k}_0^{(p)} = (\lfloor N_{RB}^{UL}/2 \rfloor - m_{SRS,0}/2 - \Delta_{offset}^{PRB}) N_{SC}^{RB} + k_{TC}^{(p)}$, where the first frequency domain starting position is: $\bar{k}_1^{(p)} = (\lfloor N_{RB}^{UL}/2 \rfloor - m_{SRS,0}/2) N_{SC}^{RB} + k_{TC}^{(p)}$;

(2) $\bar{k}_0^{(p)} = (N_{RB}^{UL} - m_{SRS,0}^{max} - \Delta_{offset}^{PRB}) N_{sc}^{RB} + k_{TC}^{(p)}$, where the first frequency domain starting position is: $\bar{k}_1^{(p)} = (N_{RB}^{UL} - m_{SRS,0}^{max}) N_{sc}^{RB} + k_{TC}^{(p)}$; or (3) $\bar{k}_0^{(p)} = k_{TC}^{(p)} + \Delta_{offset}^{PRB} N_{sc}^{RB}$, where the first frequency domain starting position is: $\bar{k}_1^{(p)} = k_{TC}^{(p)}$.

$\Delta_{offset}^{PRB}$ is the offset value of the frequency domain start position corresponding to the maximum bandwidth in the multi-level bandwidth structure containing the reference signal relative to the first frequency domain start position and is an integer in units of $N_{SC}^{RB}$, $N_{RB}^{UL}$ represents the bandwidth part, $m_{SRS,0}$ is length information of a frequency domain bandwidth corresponding to the maximum bandwidth in the multi-level bandwidth structure, $k_{TC}^{(p)}$ represents an offset quantity of the maximum bandwidth within a unit $N_{SC}^{RB}$, p is a port index, and $m_{SRS,0}^{max}$ is length information of a maximum bandwidth in one or more multi-level bandwidth structures.

In an exemplary implementation mode, the calculation manner of a frequency domain starting position of a maximum bandwidth of the reference signal in a multi-level bandwidth structure includes one of:

(1) $\bar{k}_0^{(p)} = K_{TC}^{(p)}$;

(2) $\bar{k}_0^{(p)} = \left( \left\lfloor \frac{N_{RB}^{UL}}{2} \right\rfloor - m_{SRS,b} \Pi_{b'=0}^{B_{SRS}} \frac{N_{b'}}{2} \right) N_{SC}^{RB} + K_{TC}^{(p)}$;

(3) $\bar{k}_0^{(p)} = (N_{RB}^{UL} - m_{SRS,b} \Pi_{b'=0}^{B_{SRS}} N_{b'}) N_{SC}^{RB} + K_{TC}^{(p)}$;

(4) $\bar{k}_0^{(p)} = \left( \left\lfloor \frac{N_{RB}^{UL}}{2} \right\rfloor - m_{SRS,0}/2 - \Delta_{offset}^{PRB} \right) N_{SC}^{RB} + k_{TC}^{(p)}$;

(5) $\bar{k}_0^{(p)} = (N_{RB}^{UL} - m_{SRS,0}^{max}) N_{sc}^{RB} + k_{TC}^{(p)}$;

(6) $\bar{k}_0^{(p)} = (\lfloor N_{RB}^{UL}/2 \rfloor - m_{SRS,0}/2) N_{SC}^{RB} + k_{TC}^{(p)}$;

(7) $\bar{k}_0^{(p)} = (N_{RB}^{UL} - m_{SRS,0}^{max} - \Delta_{offset}^{PRB}) N_{sc}^{RB} + k_{TC}^{(p)}$; or (8) $\bar{k}_0^{(p)} = k_{TC}^{(p)} + \Delta_{offset}^{PRB} N_{sc}^{RB}$;

$\Delta_{offset}^{PRB}$ is an offset value and an integer in units of $N_{SC}^{RB}$, $N_{RB}^{UL}$ represents the bandwidth part, $m_{SRS,0}$ is length information of a frequency domain bandwidth corresponding to the maximum bandwidth in the multi-level bandwidth structure, $k_{TC}^{(p)}$ represents an offset quantity of the maximum bandwidth within a unit $N_{SC}^{RB}$, p is a port index, and $B_{SRS}$ is level information of a bandwidth, in the multi-level bandwidth structure, of the reference signal on one frequency domain symbol; and $N_{b'}$ is the number of bandwidths, of a b'th level, included in one bandwidth of a (b'−1)th level, and $m_{SRS,0}^{max}$ is length information of a maximum bandwidth in one or more multi-level bandwidth structures.

In an exemplary implementation mode, one bandwidth of bandwidths of a bth level in the multi-level structure containing the reference signal includes one or more bandwidths of a (b+1)th level, where b is a non-negative integer.

In an exemplary implementation mode, the parameter or a configuration range of the parameter is obtained according to position information of a time domain symbol in one time unit; or a reference signal resource is located on different time domain symbols in one time unit, and the parameter or the configuration range of the parameter is different.

In an exemplary implementation mode, the antenna port number or index remains unchanged on M consecutive time domain symbols, where M is an integer greater than 0.

In an exemplary implementation mode, when a plurality of resources are indicated through the signaling, configuration values or parameter values of the plurality of resources are the same on L consecutive time domain symbols, or configuration values or parameter values of the plurality of resources are different on L consecutive time domain symbols, where L is an integer greater than 0.

In an exemplary implementation mode, when a plurality of resources are indicated through the signaling, the plurality of resources constitute a resource set or a resource group, and a parameter of the resource set or the resource group is configured to indicate whether the plurality of resources in the resource set or the resource group are the same or repeated.

In an exemplary implementation mode, when the parameter indicating whether a resource is repeated or the same has a value of 1 or the state is on, the parameter indicating whether a resource is repeated or the same indicates that all parameter configuration values of a plurality of SRS resources in a resource set or a resource group are the same, or that parameter values used for representing transmission beams or antenna ports or frequency domain resources in the plurality of SRS resources are the same, or that the plurality of SRS resources use a same transmission beam or antenna port or frequency domain resource.

In an exemplary implementation mode, a plurality of the resources are configured to implement at least one function of a group consisting of:

switching of antennas or transmission ports of a reference signal;

transmitting of a reference signal on a plurality of time domain resources in a same transmission manner or at a same frequency domain position; and reception on the first communication node of a reference signal transmitted from the second communication node on a plurality of time domain resources in a same receiving manner.

In an exemplary implementation mode, the number of segments $N_i <= N_j$, where <= represents less than or equal to; and i<j.

Figure 2:
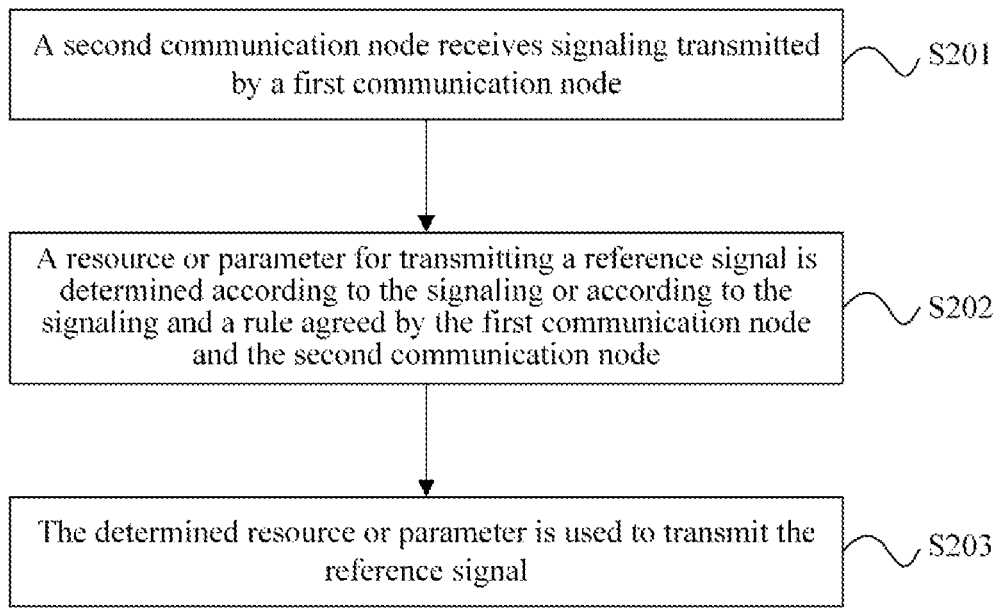
FIG. 2 is a flowchart of another information transmission method according to an embodiment of the present application.

FIG. 2 is a flowchart of an information transmission method according to an embodiment of the present application. As illustrated in FIG. 2, the information transmission method in the embodiment may include the steps described below.

In S201, a second communication node receives signaling transmitted by a first communication node.

In S202, a resource or parameter for transmitting a reference signal is determined based on the signaling or based on the signaling and a rule predefined by the first communication node and the second communication node.

In S203, the resource or parameter is used to transmit the reference signal.

In the embodiment, the first communication node refers to a node configured to determine a transmission mode of the second communication node and to perform signaling indication to the second communication node, and the second communication node refers to a node configured to receive the signaling. In an implementation mode, the first communication node may be nodes such as a base station of a macro cell, a base station or transmission node of a small cell, a sending node in a high-frequency communication system, or a sending node in an Internet of Things system, and the second communication node may be nodes in a communication system such as a UE, a mobile phone, a portable device, or a car. In another implementation mode, the base station of a macro cell, the base station or transmission node of a small cell, the sending node in a high-frequency communication system, the sending node in an Internet of Things system, or the like may serve as the second communication node, and the UE may serve as the first communication node.

In the embodiment, the signaling may include at least one of: RRC signaling, MAC CE signaling, physical downlink control signaling, or physical layer dynamic control signaling.

In the embodiment, the reference signal includes one of: a SRS, an uplink demodulation reference signal, a downlink demodulation reference signal, a CSI-RS, an uplink PTRS, and a downlink PTRS.

In an exemplary implementation mode, the resource or parameter includes at least one of: a frequency domain starting position, a frequency domain end position, a transmission bandwidth, a number of segments, a bandwidth configuration index, a bandwidth parameter, a parameter configured to indicate whether a resource is repeated or the same, an antenna port number or index, a calculation manner of a frequency domain starting position of a maximum bandwidth of the reference signal in a multi-level bandwidth structure, a parameter related to obtaining the frequency domain starting position of the maximum bandwidth of the reference signal in the multi-level bandwidth structure, or information of the multi-level bandwidth structure containing the reference signal.

In an exemplary implementation mode, determining a resource or parameter for transmitting a reference signal based on the signaling or based on the signaling and a rule predefined by the first communication node and the second communication node includes at least one of the steps described below.

The second communication node determines a bandwidth configuration index actually used by the second communication node based on at least one of a bandwidth value or the bandwidth configuration index of a bandwidth part (BWP) configured by the signaling for the second communication node and the rule predefined by the first communication node and the second communication node.

The second communication node determines a transmission bandwidth set of the reference signal based on the bandwidth configuration index of the reference signal and the rule predefined by the first communication node and the second communication node.

The second communication node determines the transmission bandwidth or the number of segments of the reference signal based on at least one of the bandwidth value, the bandwidth configuration index or the bandwidth parameter of the bandwidth part configured by the signaling for the second communication node and the rule predefined by the first communication node and the second communication node.

In an exemplary implementation mode, the step in which the second communication node determines a bandwidth configuration index actually used by the second communication node based on at least one of a bandwidth value or the bandwidth configuration index of a bandwidth part configured by the signaling for the second communication node and the rule predefined by the first communication node and the second communication node includes the step described below.

Determining the bandwidth configuration index actually used by the second communication node includes at least one of:

(1) $4 \times \lfloor \frac{N_{BWP}}{4} \rfloor - C_{SRS}$;

(2) $8 \times \lfloor \frac{N_{BWP}}{8} \rfloor - C_{SRS}$;

(3) $12 \times \lfloor \frac{N_{BWP}}{12} \rfloor - C_{SRS}$;

(4) $16 \times \lfloor \frac{N_{BWP}}{16} \rfloor - C_{SRS}$;

or (5) when a maximum transmission bandwidth of the reference signal corresponding to the bandwidth configuration index is less than or equal to $$4 \times \lfloor \frac{N_{BWP}}{4} \rfloor \text{ or } 8 \times \lfloor \frac{N_{BWP}}{8} \rfloor \text{ or } 12 \times \lfloor \frac{N_{BWP}}{12} \rfloor \text{ or } 16 \times \lfloor \frac{N_{BWP}}{16} \rfloor,$$

selecting a maximum bandwidth configuration index and subtracting the maximum bandwidth configuration index by $C_{SRS}$ to obtain as the bandwidth configuration index actually used by the second communication node.

$\lfloor \ \rfloor$ is a round-down function, $N_{BWP}$ is the bandwidth value of the bandwidth part, $C_{SRS}$ is the bandwidth configuration index, and the first communication node configures $C_{SRS}$ and $N_{BWP}$ for the second communication node through the signaling.

In an exemplary implementation mode, the step in which the second communication node determines a transmission bandwidth set of the reference signal based on the bandwidth configuration index of the reference signal and the rule predefined by the first communication node and the second communication node includes the step described below.

When the bandwidth configuration index of the reference signal is greater than or equal to 17, or the bandwidth configuration index of the reference signal is less than or equal to 14, or the bandwidth configuration index of the reference signal is an integer comprised in a range from 0 to 31 or from 0 to 63, indicating the transmission bandwidth set includes at least one of:

(1) 108, 36, 12, 4;
(2) 112, 56, 28, 4;
(3) 112, 56, 8, 4;
(4) 120, 60, 20, 4;
(5) 120, 40, 20, 4;
(6) 128, 64, 32, 4;
(7) 128, 32, 16, 4;
(8) 128, 32, 8, 4;
(9) 136, 68, 4, 4;
(10) 144, 72, 24, 4;
(11) 144, 72, 36, 4;
(12) 144, 72, 12, 4;
(13) 144, 48, 24, 4;
(14) 144, 48, 12, 4;
(15) 144, 48, 16, 4;
(16) 144, 48, 8, 4;
(17) 160, 80, 40, 4;
(18) 160, 80, 20, 4;
(19) 160, 40, 20, 4;
(20) 160, 40, 8, 4;
(21) 168, 84, 28, 4;

(22) 176, 88, 44, 4;
(23) 180, 60, 20, 4;
(24) 192, 96, 32, 4;
(25) 192, 96, 48, 4;
(26) 192, 48, 24, 4;
(27) 192, 48, 16, 4;
(28) 192, 48, 12, 4;
(29) 200, 100, 20, 4;
(30) 200, 40, 20, 4;
(31) 200, 40, 8, 4;
(32) 208, 104, 52, 4;
(33) 216, 108, 36, 4;
(34) 240, 120, 60, 4;
(35) 240, 120, 40, 4;
(36) 240, 120, 20, 4;
(37) 240, 80, 40, 4;
(38) 240, 80, 20, 4;
(39) 240, 80, 8, 4;
(40) 256, 128, 64, 4;
(41) 256, 64, 32, 4;
(42) 256, 64, 16, 4;
(43) 256, 64, 8, 4; or
(44) 272, 136, 68, 4.

In an exemplary implementation mode, the step in which the second communication node determines the transmission bandwidth or the number of segments of the reference signal based on at least one of the bandwidth value, the bandwidth configuration index or the bandwidth parameter of the bandwidth part configured by the signaling for the second communication node and the rule predefined by the first communication node and the second communication node is performed in one of the following manners:

Manner 1:

Let $k_i = \text{floor}\left(\frac{(N_{BWP} - 4 \times C_{SRS})/4}{2^i}\right)$, then the transmission bandwidth is:

$m_{SRS,0} = 4 \times k_0$;

$m_{SRS,i+1} = \begin{cases} 4 \times k_{i+1}, & \text{if } ((N_{BWP} - 4 \times C_{SRS})/4) \bmod 2^i = 0 \text{ and } k_i \in \text{Even} \\ 4, & \text{otherwise.} \end{cases}$ Manner 2:

Let $k_i = \text{floor}\left(\frac{(N_{BWP} - 4 \times C_{SRS})/4}{2^i}\right)$, then the transmission bandwidth is:

$m_{SRS,0} = 4 \times k_0$;

$m_{SRS,i+1} = \begin{cases} 4 \times k_{i+1}, & \text{if } ((N_{BWP} + 4 \times C_{SRS})/4) \bmod 2^i = 0 \text{ and } k_i \in \text{Even} \\ 4, & \text{otherwise} \end{cases}$.

Manner 3:
The number of segments is:

$N_0 = 1$;

$N_{i+1} = \begin{cases} 2, & \text{if } ((N_{BWP} - 4 \times C_{SRS})/4) \bmod 2^i = 0 \text{ and } k_i \in \text{Even} \\ k_i, & \text{if } ((N_{BWP} - 4 \times C_{SRS})/4) \bmod 2^i = 0 \text{ and } k_i \in \text{Odd} \\ 1, & \text{otherwise} \end{cases}$.

Manner 4:
The transmission bandwidth is $m_{SRS,i} = \begin{cases} 16 \times \lfloor (N_{BWP} - 16 \times C_{SRS})/16 \rfloor / 2^i, & \text{if } i < 3 \\ 4, & \text{otherwise} \end{cases}$; or $m_{SRS,i} = \begin{cases} 16 \times \lfloor (N_{BWP} + 16 \times C_{SRS})/16 \rfloor / 2^i, & \text{if } i < 3 \\ 4, & \text{otherwise} \end{cases}$.

Manner 6:
The transmission bandwidth is $m_{SRS,i} = \begin{cases} 16 \times \lfloor (N_{BWP} - 16 \times C_{SRS})/16 \rfloor / d_i, & \text{if } i < 3 \\ 4, & \text{otherwise} \end{cases}$; or $m_{SRS,i} = \begin{cases} 16 \times \lfloor (N_{BWP} + 16 \times C_{SRS})/16 \rfloor / d_i, & \text{if } i < 3 \\ 4, & \text{otherwise} \end{cases}$.

$d_i$ is $2^i \times 3^j \times 5^l$, or $d_i$ is one or more integers in a range from 1 to 17, including 1 and 17, values of i, j and l are non-negative integers, $m_{SRS,i}$ is the transmission bandwidth of the reference signal, floor( ) is a round-down function, $\lfloor \ \rfloor$ is a round-down function, $i=B_{SRS}$, $B_{SRS}$ is the bandwidth parameter of the reference signal, $N_{BWP}$ is the bandwidth value of the bandwidth part, and the first communication node configures $B_{SRS}$ and $N_{BWP}$ for the second communication node through the signaling.

In an exemplary implementation mode, determining a resource or parameter for transmitting a reference signal based on the signaling or based on the signaling and a rule predefined by the first communication node and the second communication node includes the steps described below.

An offset value of a frequency domain starting position corresponding to a maximum bandwidth in a multi-level bandwidth structure containing the reference signal relative to a first frequency domain starting position is obtained through the signaling or the agreed rule, where the first frequency domain starting position is obtained by the second communication node based on the rule predefined by the first communication node and the second communication node.

In an exemplary implementation mode, the calculation manner of a frequency domain starting position of a maximum bandwidth of the reference signal in a multi-level bandwidth structure includes at least one of:

(1) $\overline{k}_0^{(p)} = (\lfloor N_{RB}^{UL}/2 \rfloor - m_{SRS,0}/2 - \Delta_{offset}^{PRB}) N_{SC}^{RB} + k_{TC}^{(p)}$, where the first frequency domain starting position is: $\overline{k}_1^{(p)} = (\lfloor N_{RB}^{UL}/2 \rfloor - m_{SRS,0}/2) N_{SC}^{RB} + k_{TC}^{(p)}$;

(2) $\overline{k}_0^{(p)} = (\lfloor N_{RB}^{UL} - m_{SRS,0}^{max} - \Delta_{offset}^{PRB}) N_{SC}^{RB} + k_{TC}^{(p)}$, where the first frequency domain starting position is: $\overline{k}_1^{(p)} = (\lfloor N_{RB}^{UL} - m_{SRS,0}^{max}) N_{SC}^{RB} + k_{TC}^{(p)}$; or (3) $\overline{k}_0^{(p)} = k_{TC}^{(p)} + \Delta_{offset}^{PRB} N_{SC}^{RB}$, where the first frequency domain starting position is: $\overline{k}_1^{(p)} = k_{TC}^{(p)}$.

$\Delta_{offset}^{PRB}$ is the offset value of the frequency domain start position corresponding to the maximum bandwidth in the multi-level bandwidth structure containing the reference signal relative to the first frequency domain start position and is an integer in units of $N_{SC}^{RB}$, $N_{RB}^{UL}$ represents the bandwidth part, $m_{SRS,0}$ is length information of a frequency domain bandwidth corresponding to the maximum bandwidth in the multi-level bandwidth structure, $k_{TC}^{(p)}$ represents an offset quantity of the maximum bandwidth within a unit $N_{SC}^{RB}$, p is a port index, and $m_{SRS,0}^{max}$ is length information of a maximum bandwidth in one or more multi-level bandwidth structures.

In an exemplary implementation mode, the calculation manner of a frequency domain starting position of a maximum bandwidth of the reference signal in a multi-level bandwidth structure includes one of:

(1) $\bar{k}_0^{(p)} = K_{TC}^{(p)}$;

(2) $\bar{k}_0^{(p)} = \left(\left\lfloor \frac{N_{RB}^{UL}}{2} \right\rfloor - m_{SRS,b} \prod_{b'=0}^{B_{SRS}} \frac{N_{b'}}{2}\right) N_{SC}^{RB} + K_{TC}^{(p)}$;

(3) $\bar{k}_0^{(p)} = \left(N_{RB}^{UL} - m_{SRS,b} \prod_{b'=0}^{B_{SRS}} N_{b'}\right) N_{SC}^{RB} + K_{TC}^{(p)}$;

(4) $\bar{k}_0^{(p)} = (\lfloor N_{RB}^{UL}/2 \rfloor - m_{SRS,0}/2 - \Delta_{offset}^{PRB}) N_{SC}^{RB} + k_{TC}^{(p)}$;

(5) $\bar{k}_0^{(p)} = (N_{RB}^{UL} - m_{SRS,0}^{max}) N_{sc}^{RB} + k_{TC}^{(p)}$;

(6) $\bar{k}_0^{(p)} = (\lfloor N_{RB}^{UL}/2 \rfloor - m_{SRS,0}/2) N_{SC}^{RB} + k_{TC}^{(p)}$;

(7) $\bar{k}_0^{(p)} = (N_{RB}^{UL} - m_{SRS,0}^{max} - \Delta_{offset}^{PRB}) N_{sc}^{RB} + k_{TC}^{(p)}$; or (8) $\bar{k}_0^{(p)} = k_{TC}^{(p)} + \Delta_{offset}^{PRB} N_{sc}^{RB}$.

$\Delta_{offset}^{PRB}$ is an offset value and an integer in units of $N_{SC}^{RB}$, $N_{RB}^{UL}$ represents the bandwidth part, $m_{SRS,0}$ is length information of a frequency domain bandwidth corresponding to the maximum bandwidth in the multi-level bandwidth structure, $k_{TC}^{(p)}$ represents an offset quantity of the maximum bandwidth within a unit $N_{SC}^{RB}$, p is a port index, and $B_{SRS}$ is level information of a bandwidth, in the multi-level bandwidth structure, of the reference signal on one frequency domain symbol; and $N_{b'}$ is the number of bandwidths of a b' level included in one bandwidth of the (b'−1) level, and $m_{SRS,0}^{max}$ is length information of a maximum bandwidth in one or more multi-level bandwidth structures.

In an exemplary implementation mode, one bandwidth of bandwidths of a bth level in the multi-level structure containing the reference signal includes one or more bandwidths of a (b+1)th level, where b is a non-negative integer.

In an exemplary implementation mode, the parameter or a configuration range of the parameter is obtained according to position information of a time domain symbol in one time unit; or a reference signal resource is located on different time domain symbols in one time unit, and the parameter or the configuration range of the parameter is different.

In an exemplary implementation mode, the antenna port number or index remains unchanged on M consecutive time domain symbols, where M is an integer greater than 0.

In an exemplary implementation mode, when a plurality of resources for transmitting the reference signal are included, configuration values or parameter values of the plurality of resources are the same on L consecutive time domain symbols, or configuration values or parameter values of the plurality of resources are different on L consecutive time domain symbols, where L is an integer greater than 0.

In an exemplary implementation mode, when a plurality of resources for transmitting the reference signal are included, the plurality of resources constitute a resource set or a resource group, and a parameter of the resource set or the resource group is configured to indicate whether the plurality of resources in the resource set or the resource group are the same or repeated.

In an exemplary implementation mode, when the parameter indicating whether a resource is repeated or the same has a value of 1 or the state is on, the parameter indicating whether a resource is repeated or the same indicates that all parameter configuration values of a plurality of SRS resources in a resource set or a resource group are the same, or that parameter values used for representing transmission beams or antenna ports or frequency domain resources in the plurality of SRS resources are the same, or that the plurality of SRS resources use a same transmission beam or antenna port or frequency domain resource.

Figure 3:
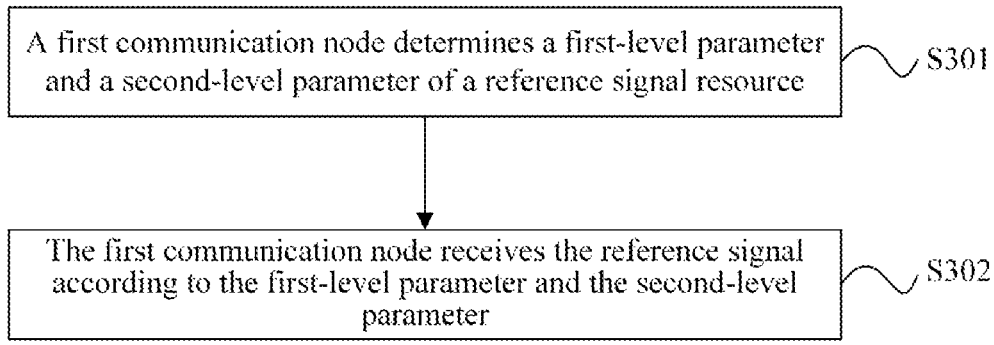
FIG. 3 is a flowchart of another information transmission method according to an embodiment of the present application.

FIG. 3 is a flowchart of an information transmission method according to an embodiment of the present application. As illustrated in FIG. 3, the information transmission method in the embodiment may include the steps described below.

In S301, a first communication node determines a first-level parameter and a second-level parameter of a reference signal resource, where the first-level parameter includes at least one of: the number N1 of time domain symbols continuously transmitted by a reference signal in a same frequency domain unit, an antenna switching switch function A1 of the reference signal, or a frequency hopping switch function B1; and the second-level parameter includes at least one of: the number N2 of time domain symbols continuously transmitted by an antenna port group of the reference signal, an antenna switching switch function A2 of the reference signal in a time domain unit, or a frequency hopping switch function B2 of the reference signal in a time domain unit.

In S302, the first communication node receives the reference signal according to the first-level parameter and the second-level parameter.

The antenna ports in one antenna port group are simultaneously transmitted.

In an exemplary implementation mode, the step in which the first communication node receives the reference signal according to the first-level parameter and the second-level parameter includes the step described below.

For the reference signal, N1 time domain symbols are first repeatedly received in a frequency domain unit, and then N1 time domain symbols are repeatedly received in another frequency domain unit that is hopped into.

In an exemplary implementation mode, the step in which the first communication node receives the reference signal according to the first-level parameter and the second-level parameter includes the step described below.

When a plurality of port groups are provided, one port group is first used to repeatedly receive N2 time domain symbols and then another port group is used to repeatedly receive N2 time domain symbols.

In an exemplary implementation mode, N2 is less than N1.

In an exemplary implementation mode, on the N1 time domain symbols of one frequency domain unit, different antenna port groups are time-division multiplexed, and each antenna port group continuously receives N2 time domain symbols.

In an exemplary implementation mode, the method further includes the step described below.

The first communication node indicates the first-level parameter and the second-level parameter of the reference signal resource to a second communication node through signaling.

In an exemplary implementation mode, the number of time domain symbols configured in the reference signal resource is N, N1 is less than or equal to N, and N2 is less than or equal to N.

In an implementation mode of the embodiment, the first communication node may be nodes such as a base station of a macro cell, a base station or transmission node of a small cell, a sending node in a high-frequency communication system, or a sending node in an Internet of Things system, and the second communication node may be nodes in a communication system such as a UE, a mobile phone, a portable device, or a car. In another implementation mode, the base station of a macro cell, the base station or transmission node of a small cell, the sending node in a high-frequency communication system, the sending node in an Internet of Things system, or the like may serve as the second communication node, and the UE may serve as the first communication node.

Figure 4:
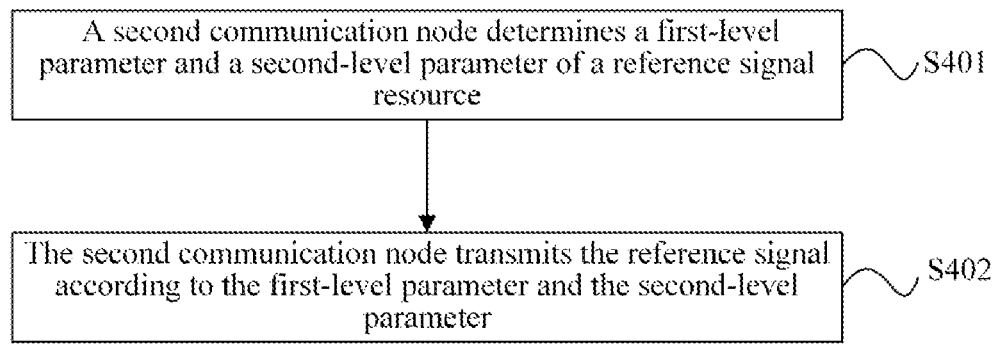
FIG. 4 is a flowchart of another information transmission method according to an embodiment of the present application.

FIG. 4 is a flowchart of an information transmission method according to an embodiment of the present application. As illustrated in FIG. 4, the information transmission method in the embodiment may include the steps described below.

In S401, a second communication node determines a first-level parameter and a second-level parameter of a reference signal resource, where the first-level parameter includes at least one of: the number N1 of time domain symbols continuously transmitted by a reference signal in a same frequency domain unit, an antenna switching switch function A1 of the reference signal, or a frequency hopping switch function B1; and the second-level parameter includes at least one of: the number N2 of time domain symbols continuously transmitted by an antenna port group of the reference signal, an antenna switching switch function A2 of the reference signal in a time domain unit, or a frequency hopping switch function B2 of the reference signal in a time domain unit.

In S402, the second communication node transmits the reference signal according to the first-level parameter and the second-level parameter.

The antenna ports in one antenna port group are simultaneously transmitted.

In an exemplary implementation mode, the step in which the second communication node transmits the reference signal according to the first-level parameter and the second-level parameter includes the step described below.

For the reference signal, N1 time domain symbols are first repeatedly transmitted in a frequency domain unit, and then N1 time domain symbols are repeatedly transmitted in another frequency domain unit that is hopped into.

In an exemplary implementation mode, the step in which the second communication node transmits the reference signal according to the first-level parameter and the second-level parameter includes the step described below.

When a plurality of port groups are provided, one port group is first used to repeatedly transmit N2 time domain symbols and then another port group is used to repeatedly transmit N2 time domain symbols.

In an exemplary implementation mode, N2 is less than N1.

In an exemplary implementation mode, on the N1 time domain symbols of one frequency domain unit, different antenna port groups are time-division multiplexed, and each antenna port group continuously transmits N2 time domain symbols.

In an exemplary implementation mode, the method further includes the step described below.

The second communication node receives signaling through which a first communication node indicates the first-level parameter and the second-level parameter of the reference signal resource.

In an exemplary implementation mode, the number of time domain symbols configured in the reference signal resource is N, N1 is less than or equal to N, and N2 is less than or equal to N.

In an implementation mode of the embodiment, the first communication node may be nodes such as a base station of a macro cell, a base station or transmission node of a small cell, a sending node in a high-frequency communication system, or a sending node in an Internet of Things system, and the second communication node may be nodes in a communication system such as a UE, a mobile phone, a portable device, or a car. In another implementation mode, the base station of a macro cell, the base station or transmission node of a small cell, the sending node in a high-frequency communication system, the sending node in an Internet of Things system, or the like may serve as the second communication node, and the UE may serve as the first communication node.

The solution of the present application will be described below by way of a plurality of examples.

Example 1

In the example, a first communication node indicates, through signaling, a parameter for a second communication node to transmit an uplink reference signal. Or both the first communication node and the second communication node predefine the parameter for the second communication node to transmit the uplink reference signal, for example, a formula for calculating a transmission bandwidth or the number of segments of a SRS is predefined by the first communication node and the second communication node.

In the example, the reference signal is described by taking the SRS as an example. The parameter may include at least one of: a bandwidth configuration index, the transmission bandwidth, or a bandwidth parameter.

In the example, after receiving the signaling transmitted by the first communication node, the second communication node may determine the transmission bandwidth or the number of segments of the SRS based on one of the following manners:

Manner 1:

$$\text{Let } k_i = \text{floor}\left(\frac{(N_{BWP} - 4 \times C_{SRS})/4}{2^i}\right),$$

then the transmission bandwidth of the SRS is:

$$m_{SRS,0} = 4 \times k_0;$$

$$m_{SRS,i+1} = \begin{cases} 4 \times k_{i+1}, & \text{if } ((N_{BWP} - 4 \times C_{SRS})/4) \bmod 2^i = 0 \text{ and } k_i \in \text{Even} \\ 4, & \text{otherwise} \end{cases}.$$

Manner 2:

$$\text{Let } k_i = \text{floor}\left(\frac{(N_{BWP} + 4 \times C_{SRS})/4}{2^i}\right),$$

then the transmission bandwidth is:

$$m_{SRS,0} = 4 \times k_0;$$

$$m_{SRS,i+1} = \begin{cases} 4 \times k_{i+1}, & \text{if } ((N_{BWP} + 4 \times C_{SRS})/4)\text{mod}\, 2^i = 0 \text{ and } k_i \in \text{Even} \\ 4, & \text{otherwise} \end{cases}$$

Manner 3:
The number of segments is:

$$N_0 = 1;$$

$$N_{i+1} = \begin{cases} 2, & \text{if } ((N_{BWP} - 4 \times C_{SRS})/4)\text{mod}\, 2^i = 0 \text{ and } k_i \in \text{Even} \\ k_i, & \text{if } ((N_{BWP} - 4 \times C_{SRS})/4)\text{mod}\, 2^i = 0 \text{ and } k_i \in \text{Odd} \\ 1, & \text{otherwise} \end{cases}.$$

The transmission bandwidth of an i-th level may be determined according to a total bandwidth and the number of segments.

Manner 4:
The transmission bandwidth of the SRS is:

$$m_{SRS,i} = 4 \times \text{floor}\left(\frac{(N_{BWP} - 4 \times C_{SRS})/4}{2^i \times 3^j \times 5^l}\right); \text{ or}$$

$$k_i = 4 \times \text{floor}\left(\frac{(N_{BWP} + 4 \times C_{SRS})/4}{2^i \times 3^j \times 5^l}\right).$$

Manner 5:
The transmission bandwidth is $$m_{SRS,i} = \begin{cases} 16 \times \lfloor (N_{BWP} - 16 \times C_{SRS})/16 \rfloor / 2^i, & \text{if } i < 3 \\ 4, & \text{otherwise} \end{cases}; \text{ or}$$

$$m_{SRS,i} = \begin{cases} 16 \times \lfloor (N_{BWP} + 16 \times C_{SRS})/16 \rfloor / 2^i, & \text{if } i < 3 \\ 4, & \text{otherwise} \end{cases}.$$

Manner 6:
The transmission bandwidth is $$m_{SRS,i} = \begin{cases} 16 \times \lfloor (N_{BWP} - 16 \times C_{SRS})/16 \rfloor / d_i, & \text{if } i < 3 \\ 4, & \text{otherwise} \end{cases}; \text{ or}$$

$$m_{SRS,i} = \begin{cases} 16 \times \lfloor (N_{BWP} + 16 \times C_{SRS})/16 \rfloor / d_i, & \text{if } i < 3 \\ 4, & \text{otherwise} \end{cases}.$$

$d_i$ is $2^i \times 3^j \times 5^l$, or $d_i$ is one or more integers in a range from 1 to 17, including 1 and 17, values of i, j and l are non-negative integers, $m_{SRS,i}$ is the transmission bandwidth of the reference signal, floor( ) is a round-down function, $\lfloor\,\rfloor$ is a round-down function, i=$B_{SRS}$, $B_{SRS}$ is the bandwidth parameter of the reference signal, $N_{BWP}$ is the bandwidth value of the bandwidth part, and the first communication node configures $B_{SRS}$ and $N_{BWP}$ for the second communication node through the signaling.

Example 2

In the example, a first communication node indicates, through signaling, a parameter for a second communication node to transmit an uplink reference signal. Or both the first communication node and the second communication node predefine the parameter for the second communication node to transmit the uplink reference signal, for example, a configuration table of a transmission bandwidth of a SRS is predefined by the first communication node and the second communication node.

In the example, the reference signal is described by taking the SRS as an example. The parameter may include at least one of: a bandwidth configuration index, the transmission bandwidth, or a bandwidth parameter.

In the example, after receiving the signaling from the first communication node, the second communication node may determine the transmission bandwidth of the SRS according to at least one of $N_{BWP}$, $C_{SRS}$ and $B_{SRS}$ that are configured with signaling and according to the predefined configuration table of the transmission bandwidth.

For the configuration table of the transmission bandwidth of the SRS, the following Table 2a or Table 2b or Table 2c or Table 2d may be referred to, where $C_{SRS}$ is the bandwidth configuration index of the SRS, $B_{SRS}$ is the bandwidth parameter of the SRS, and $N_{BWP}$ is the bandwidth value of the uplink bandwidth part. The value of at least one of $N_{BWP}$, $C_{SRS}$, and $B_{SRS}$ may be configured by the first communication node for the second communication node through signaling.

TABLE 2a

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 272 | 1 | 136 | 2 | 68 | 2 | 4 | 17 |
| 1 | 256 | 1 | 128 | 2 | 64 | 2 | 4 | 16 |
| 2 | 240 | 1 | 120 | 2 | 40 | 3 | 4 | 10 |
| 3 | 192 | 1 | 96 | 2 | 32 | 3 | 4 | 8 |
| 4 | 160 | 1 | 80 | 2 | 40 | 2 | 4 | 10 |
| 5 | 144 | 1 | 72 | 2 | 24 | 3 | 4 | 6 |
| 6 | 136 | 1 | 68 | 8 | 4 | 17 | 4 | 17 |
| 7 | 128 | 1 | 64 | 2 | 32 | 2 | 4 | 8 |
| 8 | 120 | 1 | 60 | 2 | 20 | 3 | 4 | 5 |
| 9 | 96 | 1 | 48 | 2 | 24 | 2 | 4 | 6 |
| 10 | 96 | 1 | 32 | 3 | 16 | 2 | 4 | 4 |
| 11 | 80 | 1 | 40 | 2 | 20 | 2 | 4 | 5 |
| 12 | 72 | 1 | 24 | 3 | 12 | 2 | 4 | 3 |
| 13 | 64 | 1 | 32 | 2 | 16 | 2 | 4 | 4 |
| 14 | 60 | 1 | 20 | 3 | 4 | 5 | 4 | 1 |
| 15 | 48 | 1 | 24 | 2 | 12 | 2 | 4 | 3 |
| 16 | 48 | 1 | 16 | 3 | 8 | 2 | 4 | 2 |
| 17 | 40 | 1 | 20 | 2 | 4 | 5 | 4 | 1 |
| 18 | 36 | 1 | 12 | 3 | 4 | 3 | 4 | 1 |
| 19 | 32 | 1 | 16 | 2 | 8 | 2 | 4 | 2 |
| 20 | 24 | 1 | 4 | 6 | 4 | 1 | 4 | 1 |
| 21 | 20 | 1 | 4 | 5 | 4 | 1 | 4 | 1 |
| 22 | 16 | 1 | 4 | 4 | 4 | 1 | 4 | 1 |
| 23 | 12 | 1 | 4 | 3 | 4 | 1 | 4 | 1 |
| 24 | 8 | 1 | 4 | 2 | 4 | 1 | 4 | 1 |
| 25 | 4 | 1 | 4 | 1 | 4 | 1 | 4 | 1 |
| 26 to 31 | Reserved | | | | | | | |

TABLE 2b

| $C_{SRS}$ | $B_{SRS} = 0$ | | $B_{SRS} = 1$ | | $B_{SRS} = 2$ | | $B_{SRS} = 3$ | |
| --- | --- | --- | --- | --- | --- | --- | --- | --- |
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 272 | 1 | 136 | 2 | 68 | 2 | 4 | 17 |
| 1 | 256 | 1 | 128 | 2 | 64 | 2 | 4 | 16 |
| 2 | 240 | 1 | 120 | 2 | 60 | 2 | 4 | 15 |
| 3 | 192 | 1 | 96 | 2 | 48 | 2 | 4 | 12 |
| 4 | 160 | 1 | 80 | 2 | 40 | 2 | 4 | 10 |
| 5 | 144 | 1 | 72 | 2 | 36 | 2 | 4 | 9 |
| 6 | 136 | 1 | 68 | 8 | 4 | 17 | 4 | 17 |
| 7 | 128 | 1 | 64 | 2 | 32 | 2 | 4 | 8 |
| 8 | 120 | 1 | 60 | 2 | 20 | 3 | 4 | 5 |
| 9 | 96 | 1 | 48 | 2 | 24 | 2 | 4 | 6 |
| 10 | 96 | 1 | 32 | 3 | 16 | 2 | 4 | 4 |
| 11 | 80 | 1 | 40 | 2 | 20 | 2 | 4 | 5 |
| 12 | 72 | 1 | 24 | 3 | 12 | 2 | 4 | 3 |
| 13 | 64 | 1 | 32 | 2 | 16 | 2 | 4 | 4 |
| 14 | 60 | 1 | 20 | 3 | 4 | 5 | 4 | 1 |
| 15 | 48 | 1 | 24 | 2 | 12 | 2 | 4 | 3 |

TABLE 2b-continued

| $C_{SRS}$ | $B_{SRS} = 0$ | | $B_{SRS} = 1$ | | $B_{SRS} = 2$ | | $B_{SRS} = 3$ | |
| --- | --- | --- | --- | --- | --- | --- | --- | --- |
| | $m_{SRS,0}$ | $N_0$ | $m_{SRS,1}$ | $N_1$ | $m_{SRS,2}$ | $N_2$ | $m_{SRS,3}$ | $N_3$ |
| 16 | 48 | 1 | 16 | 3 | 8 | 2 | 4 | 2 |
| 17 | 40 | 1 | 20 | 2 | 4 | 5 | 4 | 1 |
| 18 | 36 | 1 | 12 | 3 | 4 | 3 | 4 | 1 |
| 19 | 32 | 1 | 16 | 2 | 8 | 2 | 4 | 2 |
| 20 | 24 | 1 | 4 | 6 | 4 | 1 | 4 | 1 |
| 21 | 20 | 1 | 4 | 5 | 4 | 1 | 4 | 1 |
| 22 | 16 | 1 | 4 | 4 | 4 | 1 | 4 | 1 |
| 23 | 12 | 1 | 4 | 3 | 4 | 1 | 4 | 1 |
| 24 | 8 | 1 | 4 | 2 | 4 | 1 | 4 | 1 |
| 25 | 4 | 1 | 4 | 1 | 4 | 1 | 4 | 1 |
| 26 to 31 | Reserved | | | | | | | |

TABLE 2c

| $C_{SRS}$ | $B_{SRS} = 0$ | | $B_{SRS} = 1$ | | $B_{SRS} = 2$ | | $B_{SRS} = 3$ | |
| --- | --- | --- | --- | --- | --- | --- | --- | --- |
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 272 | 1 | 136 | 2 | 68 | 2 | 4 | 17 |
| 1 | 256 | 1 | 128 | 2 | 64 | 2 | 4 | 16 |
| 2 | 240 | 1 | 80 | 3 | 40 | 2 | 4 | 10 |
| 3 | 192 | 1 | 96 | 2 | 32 | 3 | 4 | 8 |
| 4 | 160 | 1 | 40 | 4 | 20 | 2 | 4 | 5 |
| 5 | 144 | 1 | 72 | 2 | 24 | 3 | 4 | 6 |
| 6 | 136 | 1 | 68 | 8 | 4 | 17 | 4 | 17 |
| 7 | 128 | 1 | 64 | 2 | 32 | 2 | 4 | 8 |
| 8 | 120 | 1 | 60 | 2 | 20 | 3 | 4 | 5 |
| 9 | 96 | 1 | 48 | 2 | 24 | 2 | 4 | 6 |
| 10 | 96 | 1 | 32 | 3 | 16 | 2 | 4 | 4 |

TABLE 2c-continued

| $C_{SRS}$ | $B_{SRS} = 0$ | | $B_{SRS} = 1$ | | $B_{SRS} = 2$ | | $B_{SRS} = 3$ | |
| --- | --- | --- | --- | --- | --- | --- | --- | --- |
| | $m_{SRS,0}$ | $N_0$ | $m_{SRS,1}$ | $N_1$ | $m_{SRS,2}$ | $N_2$ | $m_{SRS,3}$ | $N_3$ |
| 11 | 80 | 1 | 40 | 2 | 20 | 2 | 4 | 5 |
| 12 | 72 | 1 | 24 | 3 | 12 | 2 | 4 | 3 |
| 13 | 64 | 1 | 32 | 2 | 16 | 2 | 4 | 4 |
| 14 | 60 | 1 | 20 | 3 | 4 | 5 | 4 | 1 |
| 15 | 48 | 1 | 24 | 2 | 12 | 2 | 4 | 3 |
| 16 | 48 | 1 | 16 | 3 | 8 | 2 | 4 | 2 |
| 17 | 40 | 1 | 20 | 2 | 4 | 5 | 4 | 1 |
| 18 | 36 | 1 | 12 | 3 | 4 | 3 | 4 | 1 |
| 19 | 32 | 1 | 16 | 2 | 8 | 2 | 4 | 2 |
| 20 | 24 | 1 | 4 | 6 | 4 | 1 | 4 | 1 |
| 21 | 20 | 1 | 4 | 5 | 4 | 1 | 4 | 1 |
| 22 | 16 | 1 | 4 | 4 | 4 | 1 | 4 | 1 |
| 23 | 12 | 1 | 4 | 3 | 4 | 1 | 4 | 1 |
| 24 | 8 | 1 | 4 | 2 | 4 | 1 | 4 | 1 |
| 25 | 4 | 1 | 4 | 1 | 4 | 1 | 4 | 1 |
| 26 to 31 | Reserved | | | | | | | |

TABLE 2d

| Range of $N_{BWP}$ | $B_{SRS} = 0$ | | $B_{SRS} = 1$ | | $B_{SRS} = 2$ | | $B_{SRS} = 3$ | |
| --- | --- | --- | --- | --- | --- | --- | --- | --- |
| | $m_{SRS,0}$ | $N_0$ | $m_{SRS,1}$ | $N_1$ | $m_{SRS,2}$ | $N_2$ | $m_{SRS,3}$ | $N_3$ |
| $97 <= N_{BWP} < 112$ | 96 | 1 | 48 | 2 | 24 | 2 | 4 | 6 |
| $112 <= N_{BWP} < 128$ | 112 | 1 | 56 | 2 | 28 | 2 | 4 | 7 |
| $128 <= N_{BWP} < 144$ | 128 | 1 | 64 | 2 | 32 | 2 | 4 | 8 |
| $144 <= N_{BWP} < 160$ | 144 | 1 | 72 | 2 | 36 | 2 | 4 | 9 |
| $160 <= N_{BWP} < 176$ | 160 | 1 | 80 | 2 | 40 | 2 | 4 | 10 |
| $176 <= N_{BWP} < 192$ | 176 | 1 | 88 | 2 | 44 | 2 | 4 | 11 |
| $192 <= N_{BWP} < 208$ | 192 | 1 | 96 | 2 | 48 | 2 | 4 | 12 |
| $208 <= N_{BWP} < 224$ | 208 | 1 | 104 | 2 | 52 | 2 | 4 | 13 |
| $224 <= N_{BWP} < 240$ | 224 | 1 | 112 | 2 | 56 | 2 | 4 | 14 |
| $240 <= N_{BWP} < 256$ | 240 | 1 | 120 | 2 | 60 | 2 | 4 | 15 |
| $256 <= N_{BWP} < 272$ | 256 | 1 | 128 | 2 | 64 | 2 | 4 | 16 |
| $272 <= N_{BWP} <= 275$ | 272 | 1 | 136 | 2 | 68 | 2 | 4 | 17 |

Example 3

In the example, a first communication node indicates, through signaling, a parameter for a second communication node to transmit an uplink reference signal. Or both the first communication node and the second communication node predefine the parameter for the second communication node to transmit the uplink signal, for example, a configuration table of a transmission bandwidth of a SRS is predefined by the first communication node and the second communication node.

In the example, the reference signal is described by taking the SRS as an example. The parameter may include at least one of: a bandwidth configuration index, the transmission bandwidth, or a bandwidth parameter.

In the example, after receiving the signaling from the first communication node, the second communication node may determine the transmission bandwidth of the SRS according to at least one of $C_{SRS}$ and $B_{SRS}$ that are configured with signaling and according to the predefined configuration table of the transmission bandwidth.

In the example, for the configuration table of the transmission bandwidth of the SRS, the following Table 3a or Table 3b or Table 3c or Table 3d may be referred to, where $C_{SRS}$ is the bandwidth configuration index of the SRS, and $B_{SRS}$ is the bandwidth parameter of the SRS. The value of at least one of $C_{SRS}$ and $B_{SRS}$ is configured by the first communication node for the second communication node through signaling.

TABLE 3a

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 20 | 1 | 4 | 5 | 4 | 1 | 4 | 1 |
| 5 | 24 | 1 | 4 | 6 | 4 | 1 | 4 | 1 |
| 6 | 32 | 1 | 16 | 2 | 8 | 2 | 4 | 2 |
| 7 | 36 | 1 | 12 | 3 | 4 | 3 | 4 | 1 |
| 8 | 40 | 1 | 20 | 2 | 4 | 5 | 4 | 1 |
| 9 | 48 | 1 | 16 | 3 | 8 | 2 | 4 | 2 |
| 10 | 48 | 1 | 24 | 2 | 12 | 2 | 4 | 3 |
| 11 | 60 | 1 | 20 | 3 | 4 | 5 | 4 | 1 |
| 12 | 64 | 1 | 32 | 2 | 16 | 2 | 4 | 4 |
| 13 | 72 | 1 | 24 | 3 | 12 | 2 | 4 | 3 |
| 14 | 80 | 1 | 40 | 2 | 20 | 2 | 4 | 5 |
| 15 | 96 | 1 | 32 | 3 | 16 | 2 | 4 | 4 |
| 16 | 96 | 1 | 48 | 2 | 24 | 2 | 4 | 6 |
| 17 | 120 | 1 | 60 | 2 | 20 | 3 | 4 | 5 |
| 18 | 128 | 1 | 64 | 2 | 32 | 2 | 4 | 8 |
| 19 | 136 | 1 | 68 | 2 | 4 | 17 | 4 | 17 |
| 20 | 144 | 1 | 72 | 2 | 24 | 3 | 4 | 6 |
| 21 | 160 | 1 | 80 | 2 | 40 | 2 | 4 | 10 |
| 22 | 192 | 1 | 96 | 2 | 32 | 3 | 4 | 8 |
| 23 | 240 | 1 | 120 | 2 | 40 | 3 | 4 | 10 |
| 25 | 256 | 1 | 128 | 2 | 64 | 2 | 4 | 16 |
| 25 | 272 | 1 | 136 | 2 | 68 | 2 | 4 | 17 |
| 26 to 31 | | | | Reserved | | | | |

TABLE 3b

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 20 | 1 | 4 | 5 | 4 | 1 | 4 | 1 |
| 5 | 24 | 1 | 4 | 6 | 4 | 1 | 4 | 1 |
| 6 | 32 | 1 | 16 | 2 | 8 | 2 | 4 | 2 |
| 7 | 36 | 1 | 12 | 3 | 4 | 3 | 4 | 1 |
| 8 | 40 | 1 | 20 | 2 | 4 | 5 | 4 | 1 |
| 9 | 48 | 1 | 16 | 3 | 8 | 2 | 4 | 2 |
| 10 | 48 | 1 | 24 | 2 | 12 | 2 | 4 | 3 |
| 11 | 60 | 1 | 20 | 3 | 4 | 5 | 4 | 1 |
| 12 | 64 | 1 | 32 | 2 | 16 | 2 | 4 | 4 |
| 13 | 72 | 1 | 24 | 3 | 12 | 2 | 4 | 3 |
| 14 | 80 | 1 | 40 | 2 | 20 | 2 | 4 | 5 |
| 15 | 96 | 1 | 32 | 3 | 16 | 2 | 4 | 4 |
| 16 | 96 | 1 | 48 | 2 | 24 | 2 | 4 | 6 |
| 17 | 120 | 1 | 60 | 2 | 20 | 3 | 4 | 5 |
| 18 | 128 | 1 | 64 | 2 | 32 | 2 | 4 | 8 |
| 19 | 136 | 1 | 68 | 2 | 4 | 17 | 4 | 17 |
| 20 | 144 | 1 | 72 | 2 | 36 | 2 | 4 | 9 |
| 21 | 160 | 1 | 80 | 2 | 40 | 2 | 4 | 10 |
| 22 | 192 | 1 | 96 | 2 | 48 | 2 | 4 | 12 |
| 23 | 240 | 1 | 120 | 2 | 60 | 2 | 4 | 15 |
| 25 | 256 | 1 | 128 | 2 | 64 | 2 | 4 | 16 |
| 25 | 272 | 1 | 136 | 2 | 68 | 2 | 4 | 17 |
| 26 to 31 | | | | Reserved | | | | |

TABLE 3c

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 20 | 1 | 4 | 5 | 4 | 1 | 4 | 1 |
| 5 | 24 | 1 | 4 | 6 | 4 | 1 | 4 | 1 |
| 6 | 32 | 1 | 16 | 2 | 8 | 2 | 4 | 2 |
| 7 | 36 | 1 | 12 | 3 | 4 | 3 | 4 | 1 |
| 8 | 40 | 1 | 20 | 2 | 4 | 5 | 4 | 1 |
| 9 | 48 | 1 | 16 | 3 | 8 | 2 | 4 | 2 |
| 10 | 48 | 1 | 24 | 2 | 12 | 2 | 4 | 3 |
| 11 | 60 | 1 | 20 | 3 | 4 | 5 | 4 | 1 |
| 12 | 64 | 1 | 32 | 2 | 16 | 2 | 4 | 4 |
| 13 | 72 | 1 | 24 | 3 | 12 | 2 | 4 | 3 |
| 14 | 80 | 1 | 40 | 2 | 20 | 2 | 4 | 5 |
| 15 | 96 | 1 | 32 | 3 | 16 | 2 | 4 | 4 |
| 16 | 96 | 1 | 48 | 2 | 24 | 2 | 4 | 6 |
| 17 | 112 | 1 | 56 | 2 | 28 | 2 | 4 | 7 |
| 18 | 120 | 1 | 60 | 2 | 20 | 3 | 4 | 5 |
| 19 | 120 | 1 | 40 | 3 | 20 | 2 | 4 | 5 |
| 20 | 128 | 1 | 64 | 2 | 32 | 2 | 4 | 8 |
| 21 | 136 | 1 | 68 | 2 | 4 | 17 | 4 | 17 |
| 22 | 144 | 1 | 72 | 2 | 24 | 3 | 4 | 6 |
| 23 | 160 | 1 | 80 | 2 | 40 | 2 | 4 | 10 |
| 24 | 176 | 1 | 88 | 2 | 44 | 2 | 4 | 11 |
| 25 | 192 | 1 | 96 | 2 | 48 | 2 | 4 | 12 |
| 26 | 208 | 1 | 104 | 2 | 52 | 2 | 4 | 13 |
| 27 | 224 | 1 | 112 | 2 | 56 | 2 | 4 | 14 |
| 28 | 240 | 1 | 120 | 2 | 60 | 2 | 4 | 15 |
| 29 | 240 | 1 | 80 | 3 | 40 | 2 | 4 | 10 |
| 30 | 256 | 1 | 128 | 2 | 64 | 2 | 4 | 16 |
| 31 | 272 | 1 | 136 | 2 | 68 | 2 | 4 | 17 |

TABLE 3d

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 20 | 1 | 4 | 5 | 4 | 1 | 4 | 1 |
| 5 | 24 | 1 | 4 | 6 | 4 | 1 | 4 | 1 |
| 6 | 32 | 1 | 16 | 2 | 8 | 2 | 4 | 2 |
| 7 | 36 | 1 | 12 | 3 | 4 | 3 | 4 | 1 |
| 8 | 40 | 1 | 20 | 2 | 4 | 5 | 4 | 1 |
| 9 | 48 | 1 | 16 | 3 | 8 | 2 | 4 | 2 |
| 10 | 48 | 1 | 24 | 2 | 12 | 2 | 4 | 3 |
| 11 | 60 | 1 | 20 | 3 | 4 | 5 | 4 | 1 |
| 12 | 64 | 1 | 32 | 2 | 16 | 2 | 4 | 4 |
| 13 | 72 | 1 | 24 | 3 | 12 | 2 | 4 | 3 |
| 14 | 80 | 1 | 40 | 2 | 20 | 2 | 4 | 5 |
| 15 | 96 | 1 | 32 | 3 | 16 | 2 | 4 | 4 |
| 16 | 96 | 1 | 48 | 2 | 24 | 2 | 4 | 6 |
| 17 | 108 | 1 | 36 | 3 | 12 | 3 | 4 | 3 |
| 18 | 120 | 1 | 60 | 2 | 20 | 3 | 4 | 5 |
| 19 | 120 | 1 | 40 | 3 | 20 | 2 | 4 | 5 |
| 20 | 128 | 1 | 64 | 2 | 32 | 2 | 4 | 8 |
| 21 | 136 | 1 | 68 | 2 | 4 | 17 | 4 | 17 |
| 22 | 144 | 1 | 72 | 2 | 24 | 3 | 4 | 6 |
| 23 | 144 | 1 | 48 | 3 | 24 | 2 | 4 | 6 |
| 24 | 160 | 1 | 80 | 2 | 40 | 2 | 4 | 10 |
| 25 | 192 | 1 | 96 | 2 | 32 | 3 | 4 | 8 |
| 26 | 192 | 1 | 96 | 2 | 48 | 2 | 4 | 12 |
| 27 | 216 | 1 | 108 | 2 | 36 | 3 | 4 | 9 |
| 28 | 240 | 1 | 120 | 2 | 60 | 2 | 4 | 15 |
| 29 | 240 | 1 | 80 | 3 | 40 | 2 | 4 | 10 |
| 30 | 256 | 1 | 128 | 2 | 64 | 2 | 4 | 16 |
| 31 | 272 | 1 | 136 | 2 | 68 | 2 | 4 | 17 |

Example 4

In the example, a first communication node indicates, through signaling, a parameter for a second communication node to transmit an uplink reference signal. Or both the first communication node and the second communication node predefine the parameter for the second communication node to transmit the uplink signal, for example, a configuration table of a transmission bandwidth of a SRS is predefined by the first communication node and the second communication node.

In the example, the reference signal is described by taking the SRS as an example. The parameter may include at least one of: a bandwidth configuration index, the transmission bandwidth, a bandwidth parameter or a bandwidth value of an uplink bandwidth part.

In the example, after receiving the signaling from the first communication node, the second communication node determines the transmission bandwidth of the SRS according to at least one of the bandwidth value of an uplink bandwidth part, $C_{SRS}$ and $B_{SRS}$ that are configured with signaling and according to the predefined configuration table of the transmission bandwidth.

When the bandwidth value of the uplink bandwidth part $N_{RB}^{UL}$ is less than or equal to 110 physical resource blocks (PRB), the configuration table of the transmission bandwidth of the SRS in LTE is used, that is, the Table 2a or the Table 2b or the Table 2c or the Table 2d is used.

When the bandwidth value of the uplink bandwidth part is greater than 110 PRBs, Table 4e or Table 4f or Table 4g or Table 4i is used.

Table 4a lists values of $m_{SRS,b}$, and $N_b$ (b=0, 1, 2, 3) when $6 \leq N_{RB}^{UL} < 40$.

TABLE 4a

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 4b lists values of $m_{SRS,b}$, and $N_b$ (b=0, 1, 2, 3) when $6 \leq N_{RB}^{UL} < 40$.

TABLE 4b

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 4c lists values of $m_{SRS,b}$, and $N_b$ (b=0, 1, 2, 3) when $60 \leq N_{RB}^{UL} < 80$.

TABLE 4c

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 4d lists values of $m_{SRS,b}$, and $N_b$ (b=0, 1, 2, 3) when $80 \leq N_{RB}^{UL} < 110$.

TABLE 4d

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

Table 4e lists values of $m_{SRS,b}$, and $N_b$ (b=0, 1, 2, 3) when $110 \leq N_{RB}^{UL} < 160$.

TABLE 4e

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 144 | 1 | 72 | 2 | 24 | 3 | 4 | 6 |
| 1 | 136 | 1 | 68 | 8 | 4 | 17 | 4 | 17 |
| 2 | 128 | 1 | 64 | 2 | 32 | 2 | 4 | 8 |
| 3 | 96 | 1 | 48 | 2 | 24 | 2 | 4 | 6 |
| 4 | 96 | 1 | 32 | 3 | 16 | 2 | 4 | 4 |
| 5 | 80 | 1 | 40 | 2 | 20 | 2 | 4 | 5 |
| 6 | 72 | 1 | 24 | 3 | 12 | 2 | 4 | 3 |
| 7 | 64 | 1 | 32 | 2 | 16 | 2 | 4 | 4 |

Table 4f lists values of $m_{SRS,b}$, and $N_b$ (b=0, 1, 2, 3) when $160 \leq N_{RB}^{UL} < 200$.

TABLE 4f

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 192 | 1 | 96 | 2 | 32 | 3 | 4 | 8 |
| 1 | 180 | 1 | 4 | 45 | 4 | 45 | 4 | 45 |
| 2 | 160 | 1 | 80 | 2 | 40 | 2 | 4 | 10 |
| 3 | 144 | 1 | 72 | 2 | 24 | 3 | 4 | 6 |
| 4 | 136 | 1 | 68 | 8 | 4 | 17 | 4 | 17 |
| 5 | 128 | 1 | 64 | 2 | 32 | 2 | 4 | 8 |
| 6 | 96 | 1 | 48 | 2 | 24 | 2 | 4 | 6 |
| 7 | 96 | 1 | 32 | 3 | 16 | 2 | 4 | 4 |

Table 4g lists values of $m_{SRS,b}$, and $N_b$ (b=0, 1, 2, 3) when $200 \leq N_{RB}^{UL} < 240$.

TABLE 4g

| $C_{SRS}$ | $B_{SRS}$ = 0 | | $B_{SRS}$ = 1 | | $B_{SRS}$ = 2 | | $B_{SRS}$ = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 240 | 1 | 80 | 3 | 40 | 2 | 4 | 10 |
| 1 | 216 | 1 | 108 | 2 | 4 | 27 | 4 | 27 |
| 2 | 212 | 1 | 4 | 53 | 4 | 53 | 4 | 53 |
| 3 | 192 | 1 | 96 | 2 | 32 | 3 | 4 | 8 |
| 4 | 180 | 1 | 4 | 45 | 4 | 45 | 4 | 45 |
| 5 | 160 | 1 | 80 | 2 | 40 | 2 | 4 | 10 |
| 6 | 144 | 1 | 72 | 2 | 24 | 3 | 4 | 6 |
| 7 | 136 | 1 | 68 | 8 | 4 | 17 | 4 | 17 |

Table 4i lists values of $m_{SRS,b}$, and $N_b$ (b=0, 1, 2, 3) when $240 \leq N_{RB}^{UL} < 280$.

TABLE 4i

| $C_{SRS}$ | $B_{SRS}$ = 0 | | $B_{SRS}$ = 1 | | $B_{SRS}$ = 2 | | $B_{SRS}$ = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 272 | 1 | 136 | 2 | 68 | 2 | 4 | 17 |
| 1 | 256 | 1 | 128 | 2 | 64 | 2 | 4 | 16 |
| 2 | 240 | 1 | 120 | 2 | 40 | 3 | 4 | 10 |
| 3 | 240 | 1 | 80 | 3 | 40 | 2 | 4 | 10 |
| 4 | 216 | 1 | 108 | 2 | 4 | 27 | 4 | 27 |
| 5 | 212 | 1 | 4 | 53 | 4 | 53 | 4 | 53 |
| 6 | 192 | 1 | 96 | 2 | 32 | 3 | 4 | 8 |
| 7 | 180 | 1 | 4 | 45 | 4 | 45 | 4 | 45 |

In the example, the first communication node indicates, through signaling, the parameter for the second communication node to transmit the uplink reference signal, where the parameter may include: a frequency domain starting position corresponding to a maximum bandwidth of the SRS in a multi-level bandwidth structure.

For example, the calculation manner of the frequency domain starting position corresponding to the maximum bandwidth in the multi-level bandwidth structure is indicated by 2-bit physical downlink control signaling or high-layer signaling.

The calculation manner of the frequency domain starting position includes at least one of:

(1) $\bar{k}_0^{(p)} = K_{TC}^{(p)}$;

(2) $\bar{k}_0^{(p)} = \left( \left\lfloor \frac{N_{RB}^{UL}}{2} \right\rfloor - m_{SRS,b} \prod_{b'=0}^{B_{SRS}} \frac{N_{b'}}{2} \right) N_{SC}^{RB} + K_{TC}^{(p)}$;

(3) $\bar{k}_0^{(p)} = \left( N_{RB}^{UL} - m_{SRS,b} \prod_{b'=0}^{B_{SRS}} N_{b'} \right) N_{SC}^{RB} + K_{TC}^{(p)}$;

(4) $\bar{k}_0^{(p)} = (\lfloor N_{RB}^{UL}/2 \rfloor - m_{SRS,0}/2 - \Delta_{offset}^{PRB}) N_{SC}^{RB} + k_{TC}^{(p)}$;

(5) $\bar{k}_0^{(p)} = (N_{RB}^{UL} - m_{SRS,0}^{max}) N_{sc}^{RB} + k_{TC}^{(p)}$;

(6) $\bar{k}_0^{(p)} = (\lfloor N_{RB}^{UL}/2 \rfloor - m_{SRS,0}/2) N_{SC}^{RB} + k_{TC}^{(p)}$;

(7) $\bar{k}_0^{(p)} = (N_{RB}^{UL} - m_{SRS,0}^{max} - \Delta_{offset}^{PRB}) N_{sc}^{RB} + k_{TC}^{(p)}$; or (8) $\bar{k}_0^{(p)} = k_{TC}^{(p)} + \Delta_{offset}^{PRB} N_{sc}^{RB}$.

Figure 5:
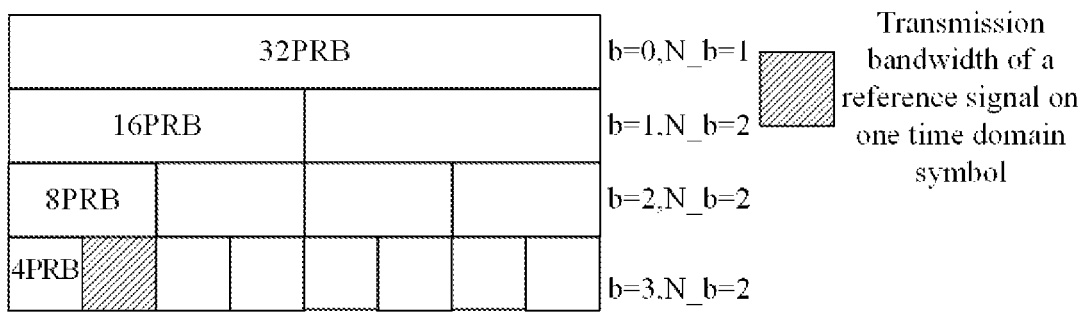
FIG. 5 is a schematic diagram 1 of a multi-level bandwidth structure corresponding to a reference signal according to an embodiment of the present application.

$\Delta_{offset}^{PRB}$ is an offset value (that is, the number of PRBs offset from the predetermined frequency domain starting position) and an integer in units of $N_{SC}^{RB}$ (for example, the number of subcarriers in a PRB); $N_{RB}^{UL}$ represents the bandwidth part or an uplink system bandwidth (in units of PRBs); $m_{SAS,0}$ is length information of a frequency domain bandwidth corresponding to the maximum bandwidth in the multi-level bandwidth structure (in units of PRBs, and for example, a length of a bandwidth of a 0th level in a tree structure); $k_{TC}^{(p)}$ represents an offset quantity of the maximum bandwidth within a unit $N_{SC}^{RB}$ (for example, a comb index value); $B_{SRS}$ is level information of a bandwidth, in the multi-level bandwidth structure, of the reference signal on one frequency domain symbol (as shown in FIG. 5, $B_{SRS}$=3); $N_{b'}$ is the number of bandwidths, of a b'th level, included in one bandwidth of a (b'−1)th level; p is a port number or port index containing the reference signal; and $m_{SRS,0}^{max}$ is length information of a maximum bandwidth in one or more multi-level bandwidth structures.

Figure 6:
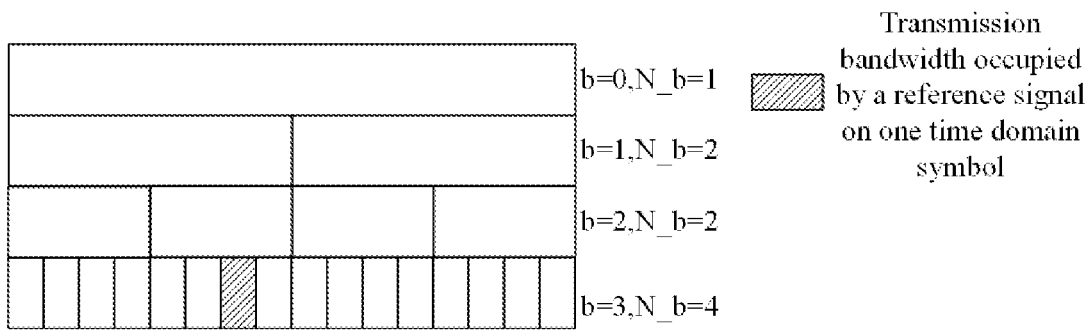
FIG. 6 is a schematic diagram 2 of a multi-level bandwidth structure corresponding to a reference signal according to an embodiment of the present application.
Figure 7A:
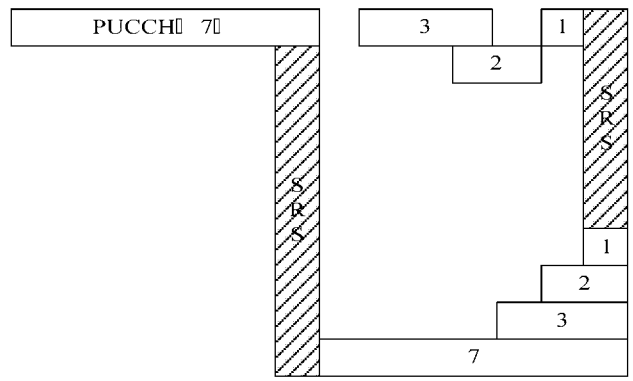
FIGS. 7 (a) to 7 (f) are schematic diagrams showing frequency domain occupancy of PUCCHs on different time domain symbols.
Figure 7B:
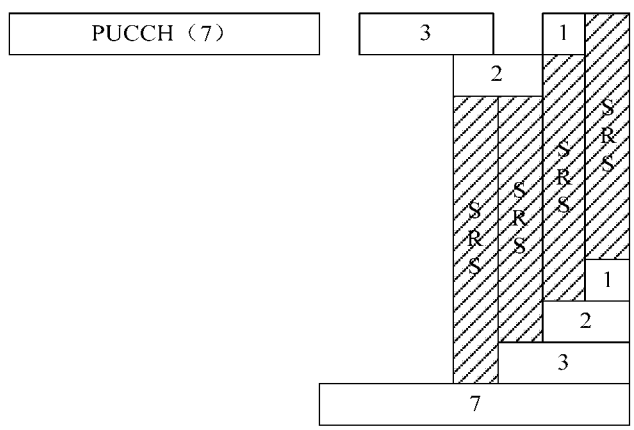
Figure 7C:
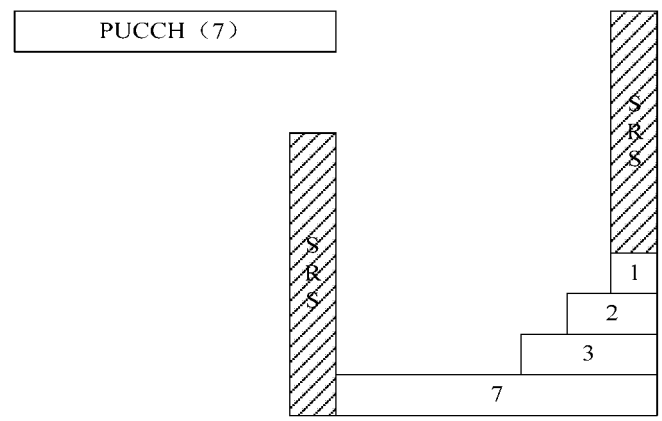
Figure 7D:
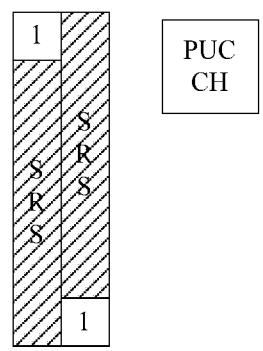
Figure 7E:
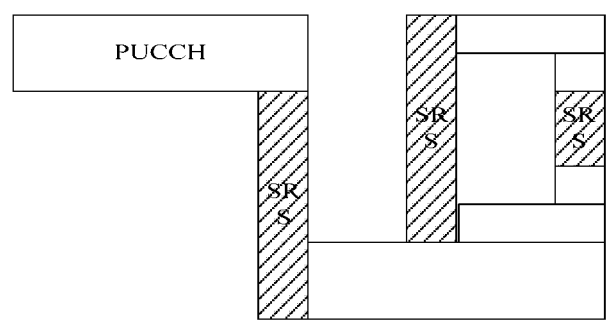
Figure 7F:
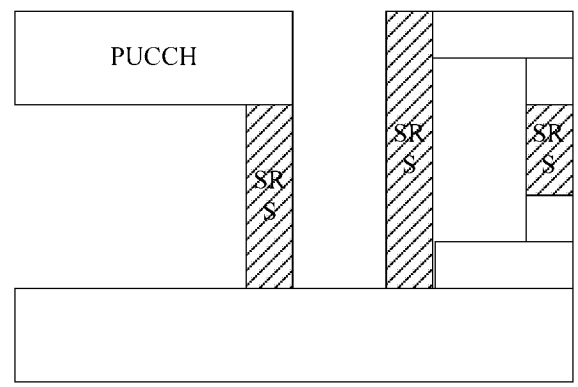

The multi-level bandwidth structure containing the reference signal represents that one bandwidth of bandwidths of a bth level includes one or more bandwidths of a (b+1)th level, which may also be referred to as the tree structure. For example, as shown in FIG. 5, one bandwidth of a (b=0)th level includes two bandwidths of a (b=1)th level, and one bandwidth of the (b=1)th level includes two bandwidths of a (b=2)th level. In FIG. 5, a bandwidth of the bth level always includes 2 bandwidths of the (b+1)th level when b is different. FIG. 5 is only an example, and other cases are not excluded, for example, in the multi-level bandwidth structure in FIG. 6, one bandwidth of the (b=2)th level corresponds to four bandwidths of the (b=3)th level.

Example 6

In the example, a first communication node indicates, through signaling, a parameter for a second communication node to transmit an uplink reference signal. Or both the first communication node and the second communication node predefine the parameter for the second communication node to transmit the uplink reference signal.

The parameter or a configuration range of the parameter is obtained according to position information of a time domain symbol in one time unit; or a reference signal resource is located on different time domain symbols in one time unit, and the parameter or the configuration range of the parameter is different.

The parameters of the SRS on different time domain symbols in a time slot are different (for example, the parameters may be configured at a time domain symbol level), and the parameters may include one or more of: a frequency domain length occupied by the SRS, a frequency domain starting position of a transmission bandwidth of the SRS, a frequency domain starting position of a tree, a frequency domain end position, a discrete frequency domain resource, a calculation manner of a frequency domain starting position of a maximum bandwidth of the reference signal in a multi-level bandwidth structure, a parameter related to obtaining the frequency domain starting position of the maximum bandwidth of the reference signal in the multi-level bandwidth structure, or configuration information of the multi-level bandwidth structure.

The physical uplink control channel (PUCCH) has different lengths, so the frequency domain resources occupied by the PUCCH are different on different time domain symbols. When the time domain symbol positions of the SRS are different, the corresponding parameters or parameter ranges need to be adjusted. FIG. 7(a) to FIG. 7(f) are different schematic diagrams of the frequency domain positions occupied by the PUCCH on different time domain symbols, and the parameters or parameter ranges of the SRS are obtained according to a position index of the time domain symbol in a time slot. The parameters may include: the transmission bandwidth of the SRS on a time domain symbol (i.e., the transmission bandwidth of the SRS may be different on different time domain symbols, similar to the difference in LTE), the frequency domain starting position of the transmission bandwidth of the SRS (i.e., the frequency domain starting position of the transmission bandwidth of the SRS may be different on different time domain symbols, similar to the difference in LTE), a frequency domain starting position of a tree (i.e., the calculation manner of a frequency domain starting position of a maximum bandwidth of the reference signal in a multi-level bandwidth structure, similar to the description herein), a frequency domain end position (for example, the frequency domain end position may be different on different time domain symbols), a discrete frequency domain resource (due to frequency domain fragments caused by the PUCCH, the PRBs occupied by the SRS may be non-contiguous on one time domain symbol, so that the PRB sets occupied by the SRSs may be different on different time domain symbols), a parameter related to obtaining the frequency domain starting position of the maximum bandwidth of the reference signal in the multi-level bandwidth structure (as described herein, which may change with the time domain symbol) or configuration information of the multi-level bandwidths (tree structure parameters are different, for example, different time domain symbols correspond to different tree structures, where a tree structure may be represented in a similar way in LTE).

In the embodiment, the parameters or parameter ranges of the reference signal may be different on different time domain symbols, where the SRSs on different time domain symbols may belong to different SRS resources, or may belong to one SRS resource. A correspondence between a time domain symbol and a parameter (or parameter range) may be established, and all SRS resources falling on a corresponding time domain symbol may comply with the parameter or parameter range corresponding to the time domain symbol. Or a correspondence between different time domain symbols and parameters (or parameter ranges) of a SRS resource is established, and different SRS resources of one user falling on the same time domain symbol may be different for the above parameters.

Example 7

In the example, a definition of a SRS resource may be well utilized for configuring parameters of the SRS. A base station may configure one or more SRS resources for a user, and each SRS resource includes a plurality of parameters, such as the number of antenna ports X, a period, a time domain subframe or time slot offset, a comb index, a frequency domain starting position, whether frequency hopping exists, or whether to perform antenna switching.

These parameters are configured with RRC signaling in the LTE system. In the NR system, all parameters may be placed in one SRS resource parameter for configuration and are also configured with the RRC signaling. Since a large number of time domain symbols in one time slot may be used for SRS transmission in the NR system, the SRS resource parameter also includes the number of time domain symbols occupied by the SRS in one time slot N and a position of the time domain symbol.

Figure 8A:
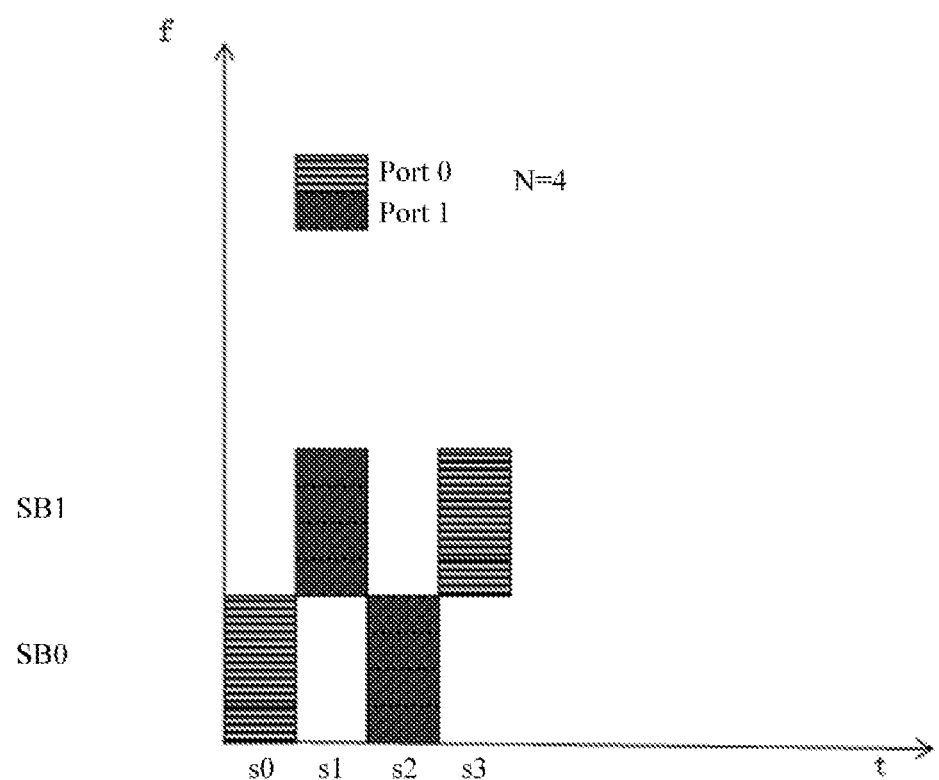
FIGS. 8 (a) to 8 (j) are schematic diagrams of an example 7 of the present application.
Figure 8B:
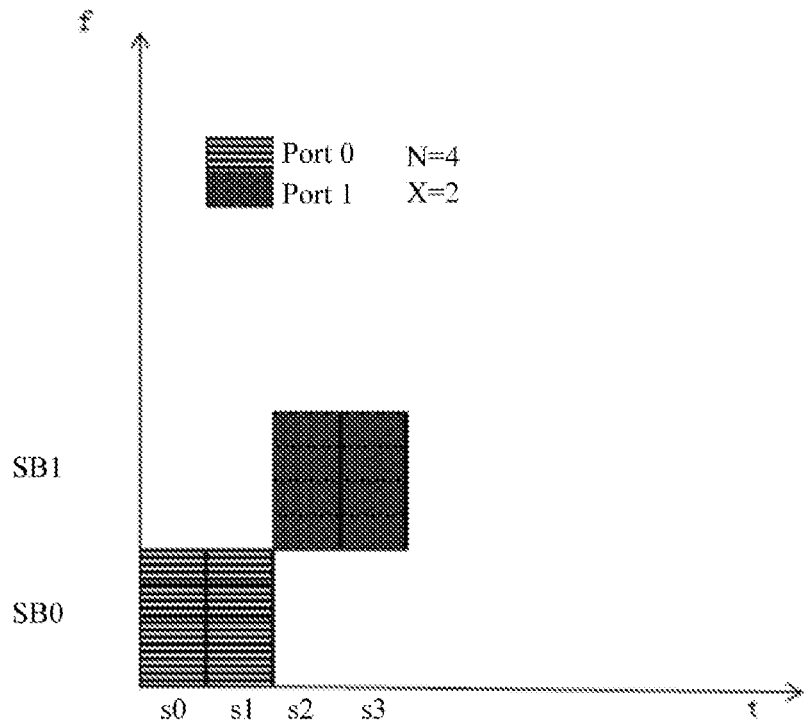
Figure 8C:
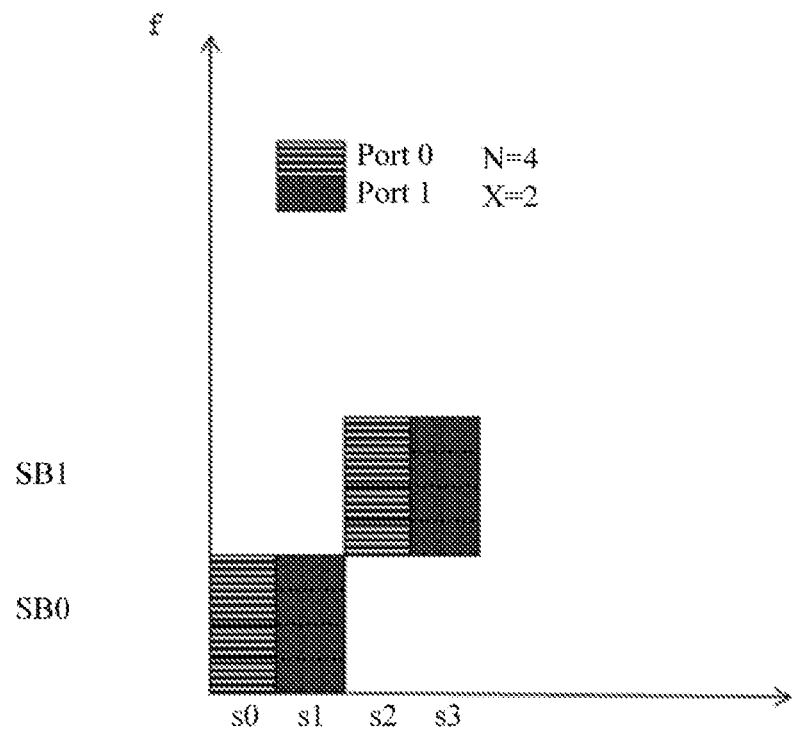
Figure 8D:
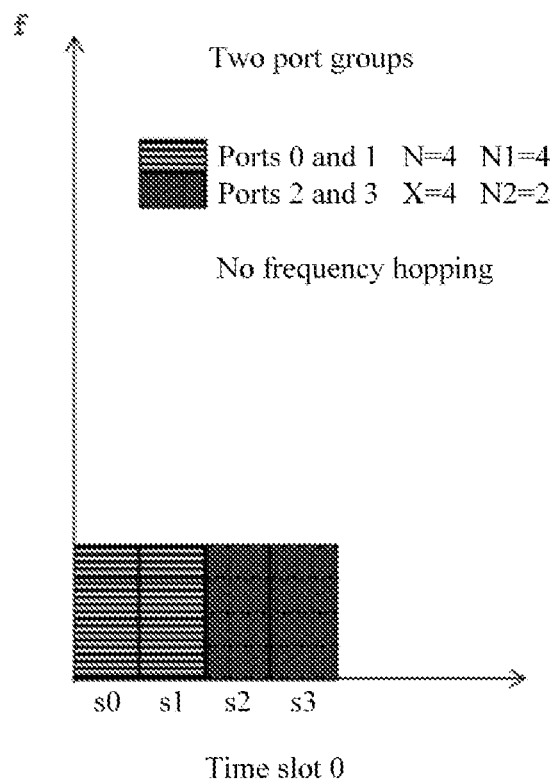
Figure 8E:
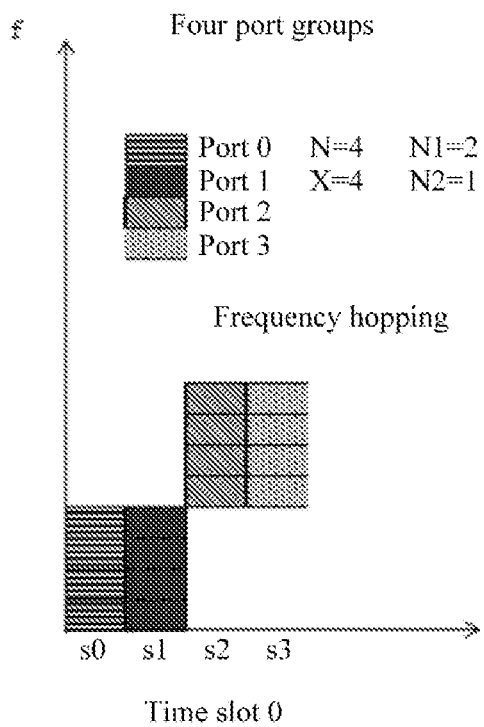
Figure 8F:
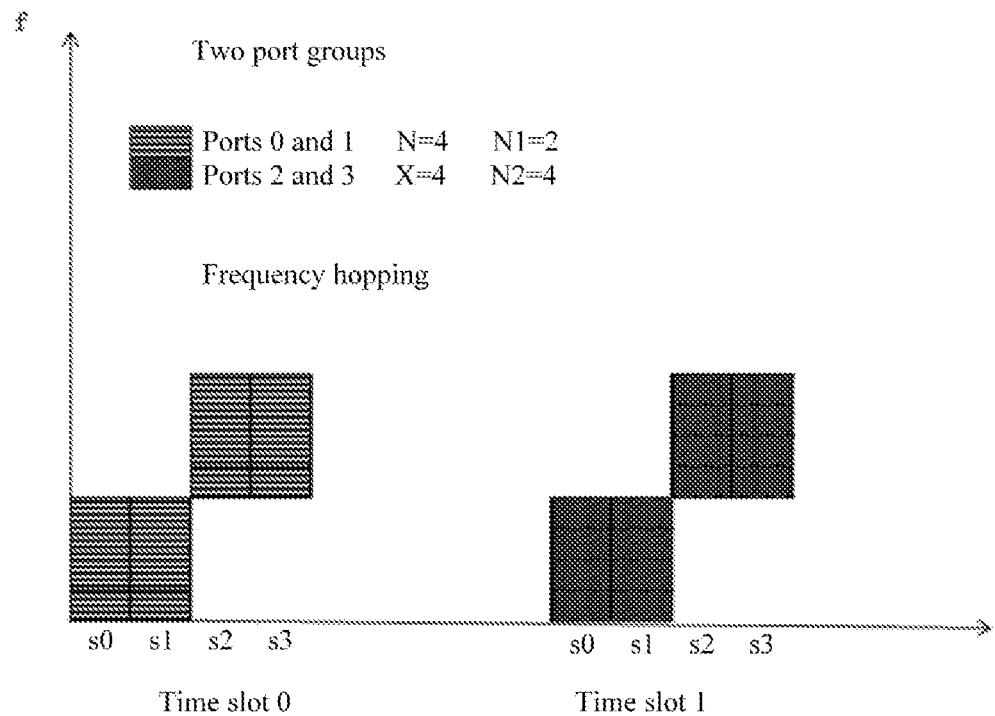
Figure 8G:
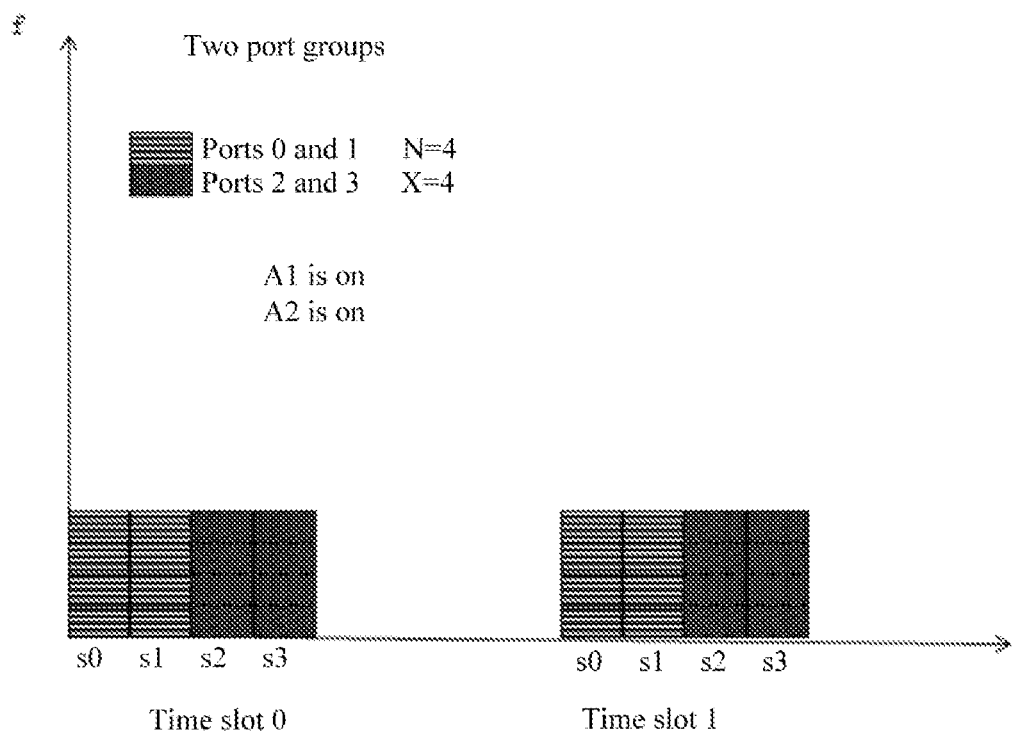
Figure 8H:
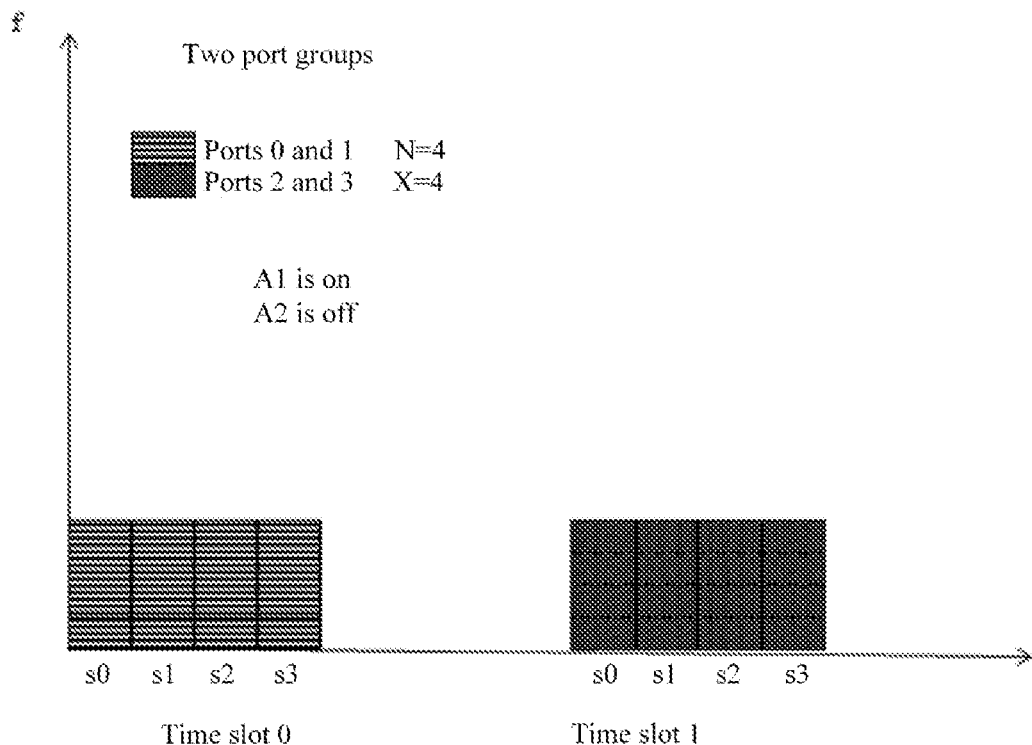
Figure 8I:
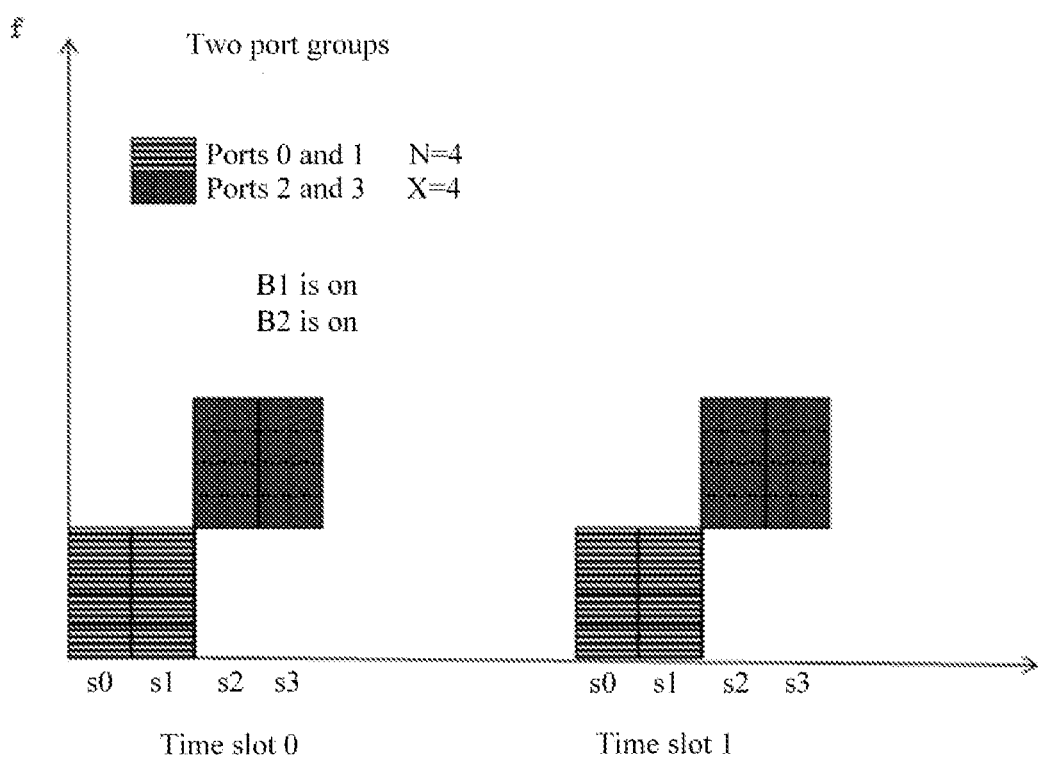
Figure 8J:
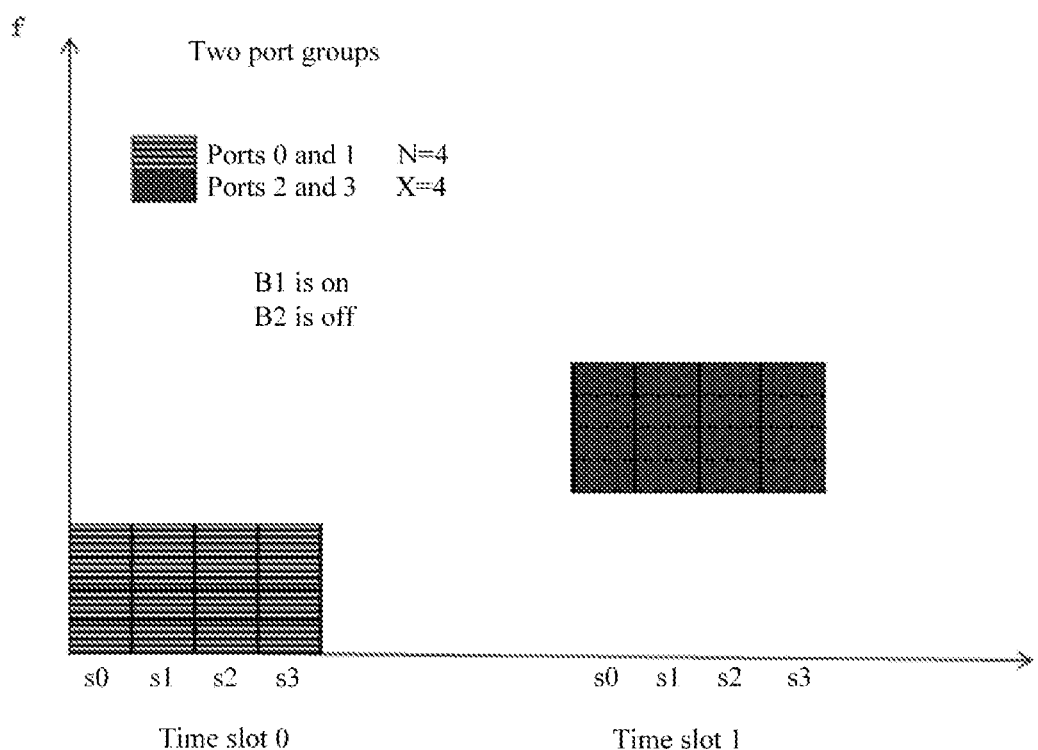

In LTE, if the antenna switching is on, only one antenna port can be mapped on each time domain symbol. If the frequency hopping is on, the SRS will be located on different subbands when transmitted continuously. If the SRS resource is configured with N time domain symbols in one time slot, the number of configured antennas is less than N, for example, if N=4, the number of antennas is 2. If the frequency hopping and antenna switching are on at the same time, the antenna and frequency switching will be too frequent, which will increase the complexity of the UE. As shown in FIG. 8(a), during SRS transmission, the antenna port needs to be switched 3 times on 4 time domain symbols in one time slot, and the frequency domain position needs to be switched 3 times. s0, s1, s2, and s3 respectively represents a different time domain symbol in one time slot. SB0 and SB1 represent different subbands or frequency domain units.

To reduce the number of switching times, a two-level parameter configuration may be newly introduced in the parameter configuration of the SRS resource. The first-level parameter configuration is the number N1 of time domain symbols continuously transmitted by the SRS in a same frequency domain unit. Within N symbols of a SRS resource configuration (defined in a period transmission, i.e., in one time slot), the number of symbols continuously transmitted by the SRS in the same frequency domain unit is the value of N1, no matter which antenna port of the SRS is used for transmission. As shown in FIG. 8 (a), on one subband, since only one time domain symbol is continuously transmitted by the SRS at one time, N1=1. As shown in FIGS. 8 (b) and 8 (c), on one subband, only two time domain symbols are continuously transmitted by the SRS at one time, so N1=2. It should be noted that N1 is the number of time domain symbols continuously transmitted by the SRS in one frequency domain unit without distinguishing the antenna ports.

The second-level configuration parameter is the number of time domain symbols continuously and repeatedly transmitted by some of the ports of the SRS, and N2 is less than N. N2 refers to the number of time domain symbols continuously and repeatedly transmitted by one antenna port group in a frequency domain unit. All antenna ports in one antenna port group occupy the same time domain symbol resource, and may also locate in the same frequency domain unit or on the same subband, but the sequence or comb may be different. As shown in FIG. 8 (b), each antenna is an antenna port group. N1=2 and N2=2, because each antenna is continuously transmitted twice on one subband. As shown in FIGS. 8 (c), N1=2 and N2=1, because the number of times each antenna is continuously transmitted on one subband is 1.

Therefore, in a SRS resource configuration parameter, any SRS transmission configuration may be achieved by adding two parameters, namely, N1 and N2. Thus the flexibility is maximized.

In one frequency domain unit and on N1 consecutive symbols, N2 time domain symbols are continuously transmitted by one antenna group, and are not simultaneously transmitted by different antenna groups. At this time, one or more antenna groups are continuously transmitted on N1 time domain symbols. As shown in FIG. 8 (c), an antenna port is an antenna port group. At this time, N1=2 and N2=1, that is, on each subband, each antenna port group is transmitted once, and time-division multiplexing is performed on N1 time domain symbols.

When the frequency hopping is on, the SRS needs to hop to another subband for transmission after continuously transmitting N1 symbols on one subband. If N1 is less than N, in one time domain unit, the SRS first repeatedly transmits N1 time domain symbols in one frequency domain unit, and then repeatedly transmits N1 time domain symbols in another frequency domain unit that is hopped into. If N2 is less than N1, on N1 symbols in a frequency domain unit, one port group of the SRS is continuously transmitted N2 times, and then another antenna port group is transmitted N2 times until N1 symbols are all occupied.

It should be noted that the N time domain symbols are not necessarily adjacent. An antenna port group may be considered as an antenna port group that can be transmitted simultaneously. For example, if the SRS is configured with 4 antennas, ports 0 and 1 are a group, ports 2 and 3 are a group and the user can only transmit one antenna port group at a time, it takes 2 times to transmit 4 ports. The port group is also configured by the base station.

Any flexible SRS transmission may be obtained based on configuration of X, N, N1 and N2 and configuration of the antenna port group. Other examples are illustrated in FIGS. 8 (*d*), 8 (*e*), and 8 (*f*). For example, as shown in FIG. 8 (*f*), since N2=4, a port group 1 (including ports 0 and 1) transmits 4 symbols before a port group 2 performs transmission. Since N1=2, the SRS transmits two time domain symbols on a subband 0 and then performs transmission on a subband 1.

Optionally, the parameter configuration of N1 and N2 may be implicitly replaced by other parameters. For example, new parameters G1 and G2 are introduced such that N1=N/G1, N2=N/G2. Or N2=N1/G2. Or to simplify the complexity of the standard, N2 may be fixed to a number, with no need for configuration, for example N2=1.

According to the parameter setting of N1 and N2, the definition of frequency hopping in LTE 36.211 may be used, and the formula of LTE only needs to be simply modified, that is, $$n_{SRS} = F \cdot \frac{N}{N1},$$

where F represents the total number of time slots transmitted from the initial transmission of the SRS to the current time. For example, $F=(n_f \cdot 10+n_{sf}) \cdot N_{slot}^{subframe}+n_s$. For a specific subcarrier interval, $n_f$ is a frame number, $n_{sf}$ is a subframe number in one frame, $N_{slot}^{subframe}$ is the number of time slots included in one subframe, and $n_s$ is a time slot number in one subframe. After this modification, N1 symbols are included in one SRS transmission, and N/N1 SRS transmissions are included in one time slot (with N symbols configured for the SRS). In this way, $n_{SRS}$ is the number of SRS transmissions in F time slots.

Similarly, according to the parameter setting of N1 and N2, the formula of antenna switching in LTE 36.213 may be used, and only needs to be simply modified. For a SRS with a total of 2 transmission antennas, and only one antenna port can be transmitted at a time, the index formula of the new antenna may be changed as follows:

$a(n_{SRS},k)=(a^{LTE}(n_{SRS})+k) \bmod 2$, where $k=0, \ldots N1/N2-1$.

The formula of $a^{LTE}(n_{SRS})$ is $a(n_{SRS})$ in the LTE formula. $a(n_{SRS},k)$ represents an index of the antennas transmitted in the kth group among the N1 symbols in the $a(n_{SRS})$ transmission. It is emphasized here that N1 time domain symbols are included in one SRS transmission, the N1 time domain symbols are divided into G2=N/N2 groups, and each group transmits one antenna port, so $k=0, \ldots G2-1$. If the UE may transmit 2 antenna ports at a time and a total of 4 antenna ports exist, then one group of transmission corresponds to 2 antenna ports. For example, the four antenna ports are divided into two groups, a port group 0 includes ports 0 and 1 and a port group 1 includes ports 2 and 3, then when k=0, $a(n_{SRS},k)=0$ refers to the antenna port group 0 transmitted in the kth group and $a(n_{SRS},k)=1$ refers to the antenna port group 1 transmitted in the kth group.

The two-level parameter configuration may further include that: the first-level parameter refers to an antenna switching switch function A1 of the SRS, that is, a switching switch between time slots. If the A1 is on, the antenna group switching is only performed between time slots and not within a time slot, at which time only one antenna group's SRS is transmitted in one time slot. If the A1 is off, the antenna group switching is not performed between time slots. The second-level parameter refers to the antenna switching switch function A2 of the SRS in a time domain unit, that is, the antenna port group switching within a time slot. If A2 is on, different antenna port groups in one time slot may be alternately transmitted. As shown in FIG. 8 (*g*), both the A1 and the A2 are on, and two antenna port groups are switched within a time slot and between time slots. As shown in FIG. 8 (*h*), the A1 is on and the A2 is off, then the antenna port group is not switched within a time slot. Thus the UE complexity may be reduced.

The two-level parameter configuration may further include that: the first-level parameter refers to a frequency hopping switch function B1 of the SRS, that is, frequency hopping between time slots. The second-level parameter refers to a frequency hopping switch function B2 of the SRS within a time slot. If both the B1 and the B2 are on, the SRS performs frequency hopping both within a time slot and between time slots, as shown in FIG. 8 (*i*). If the B1 is on and the B2 is off, the SRS only performs frequency hopping between time slots, as shown in FIG. 8 (*j*). Thus the UE complexity may be reduced.

In the method described above, in one time slot, one antenna port resource is configured with N symbols, and different antennas may be transmitted on different symbols. For more convenient antenna switching, the following configuration may be implemented: one SRS resource set is configured, where multiple SRS resources are included in the set, and each resource corresponds to one SRS antenna port or antenna port group, so that the same effect can be achieved. At this time, in a SRS resource, antenna switching is not allowed, and all antenna ports in one resource are simultaneously transmitted. For example, X resources are configured in the SRS resource set, a resource 0 represents the antenna port or antenna port group 0, a resource 1 represents the antenna port or port group 1, and a resource X−1 represents an antenna port or antenna port group X−1. If the resource has an ID, the ID may correspond to the SRS antenna port group. If each resource includes X1 antenna ports, the total number of antenna ports is X*X1. The X1 antenna ports corresponding to each resource are an antenna port group, and the antennas within a group are transmitted on the same time domain symbol.

In the SRS resource set, some parameters configured for all SRS resources are the same, such as a beam ID indicating the SRS transmission (corresponding to an ID of an already transmitted SRS resource), the number of time domain symbols included in the resource, a period, SRS transmission bandwidth (similar to CSRS in LTE), BSRS, bhop, power control and other parameters.

Example 8

In the example, a first communication node indicates, through signaling, a resource or parameter for a second communication node to transmit a reference signal. Or both the first communication node and the second communication node predefine the resource or parameter for the second communication node to transmit the reference signal.

The resource or parameter includes at least one of: a parameter indicating whether a resource is repeated or the same, or an antenna port number or index.

Exemplarily, the antenna port number or index remains unchanged on M consecutive time domain symbols, where M is an integer greater than 0.

Exemplarily, configuration values or parameter values of a plurality of resources are the same on L consecutive time domain symbols, or configuration values or parameter values of the plurality of resources are different on L consecutive time domain symbols, where L is an integer greater than 0.

Exemplarily, the plurality of resources constitute a resource set or a resource group, and a parameter of the resource set or the resource group is configured to indicate whether the plurality of resources in the resource set or the resource group are the same or repeated.

For example, the first communication node configures a resource set or resource group for the second communication node. The resource set or resource group includes one or more resources, and simultaneously includes a parameter indicating whether a resource is repeated or the same. This parameter is assumed as SRS_Resource_Repetition. If the parameter SRS_Resource_Repetition has a value of 1 or the state is on, a plurality of SRS resources in the SRS resource set or resource group are indicated to be the same or repeated; if the parameter SRS_Resource_Repetition has a value of 0 or the state is off, the SRS resources in the SRS resource set or resource group are not indicated to be the same or repeated. If the plurality of SRS resources in the SRS resource set or resource group are the same or repeated, all parameter configuration values of the plurality of SRS resources are indicated to be the same, or parameter values used for representing transmission beams or antenna ports or frequency domain resources in the plurality of SRS resources are indicated to be the same, or the plurality of SRS resources are indicated to use a same transmission beam or antenna port or frequency domain resource.

For example, a resource set or resource group includes two SRS resources, which are marked as a SRS resource 1 and a SRS resource 2. When the SRS resources are indicated to be the same, all parameter configuration values in the SRS resource 1 and the SRS resource 2 are the same, or the SRS resource 1 and the SRS resource 2 use the same transmission beam or antenna port or frequency domain resource. When the SRS resources are indicated to be different, all parameter configuration values in the SRS resource 1 and the SRS resource 2 are different, or the SRS resource 1 and the SRS resource 2 use different transmission beams or antenna ports or frequency domain resources.

Figure 9:
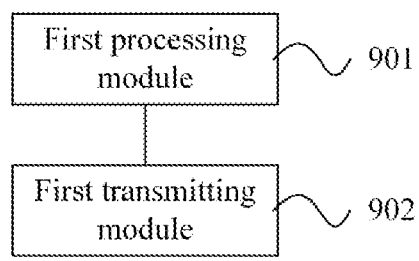
FIG. 9 is a schematic diagram of an information transmission apparatus according to an embodiment of the present application.

FIG. 9 is a schematic diagram of an information transmission apparatus according to an embodiment of the present application. As shown in FIG. 9, the embodiment provides an information transmission apparatus, applied to a first communication node, including a first processing module 901 and a first transmitting module 902.

The first processing module 901 is configured to determine a resource or parameter for a second communication node to transmit a reference signal.

The first transmitting module 902 is configured to indicate the resource or parameter to the second communication node through signaling.

The resource or parameter at least includes one or more of: a frequency domain starting position, a frequency domain end position, a transmission bandwidth, a number of segments, a bandwidth configuration index, a bandwidth parameter, a parameter indicating whether a resource is repeated or the same, an antenna port number or index, a calculation manner of a frequency domain starting position of a maximum bandwidth of the reference signal in a multi-level bandwidth structure, a parameter related to obtaining the frequency domain starting position of the maximum bandwidth of the reference signal in the multi-level bandwidth structure, or information of the multi-level bandwidth structure containing the reference signal.

For a description of the apparatus provided in the embodiment, reference may be made to the embodiment corresponding to FIG. 1, and thus no further details are provided herein.

Figure 10:
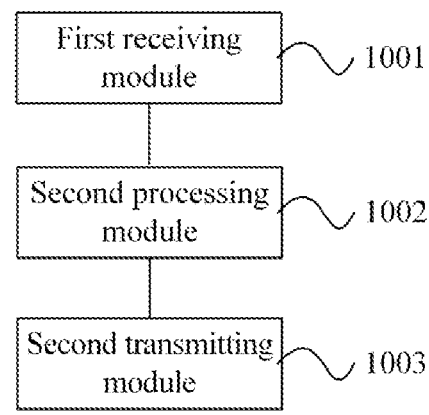
FIG. 10 is a schematic diagram of another information transmission apparatus according to an embodiment of the present application.

FIG. 10 is a schematic diagram of an information transmission apparatus according to an embodiment of the present application. As shown in FIG. 10, the embodiment provides an information transmission apparatus, applied to a second communication node, including a first receiving module 1001, a second processing module 1002 and a second transmitting module 1003.

The first receiving module 1001 is configured to receive signaling transmitted by a first communication node.

The second processing module 1002 is configured to determine a resource or parameter for transmitting a reference signal based on the signaling or based on the signaling and a rule predefined by the first communication node and the second processing module.

The second transmitting module 1003 is configured to use the resource or parameter to transmit the reference signal.

The resource or parameter includes at least one of: a frequency domain starting position, a frequency domain end position, a transmission bandwidth, a number of segments, a bandwidth configuration index, a bandwidth parameter, a parameter indicating whether a resource is repeated or the same, an antenna port number or index, a calculation manner of a frequency domain starting position of a maximum bandwidth of the reference signal in a multi-level bandwidth structure, a parameter related to obtaining the frequency domain starting position of the maximum bandwidth of the reference signal in the multi-level bandwidth structure, or information of the multi-level bandwidth structure containing the reference signal.

For a description of the apparatus provided in the embodiment, reference may be made to the embodiment corresponding to FIG. 2, and thus no further details are provided herein.

Figure 11:
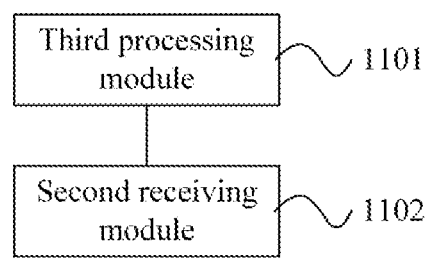
FIG. 11 is a schematic diagram of another information transmission apparatus according to an embodiment of the present application.

FIG. 11 is a schematic diagram of an information transmission apparatus according to an embodiment of the present application. As shown in FIG. 11, the embodiment provides an information transmission apparatus, applied to a first communication node, including a third processing module 1101 and a second receiving module 1102.

The third processing module 1101 is configured to determine a first-level parameter and a second-level parameter of a reference signal resource, where the first-level parameter includes at least one of: the number N1 of time domain symbols continuously transmitted by a reference signal in a same frequency domain unit, an antenna switching switch function A1 of the reference signal, or a frequency hopping switch function B1; and the second-level parameter includes at least one of: the number N2 of time domain symbols continuously transmitted by an antenna port group of the reference signal, an antenna switching switch function A2 of the reference signal in a time domain unit, or a frequency hopping switch function B2 of the reference signal in a time domain unit.

The second receiving module 1102 is configured to receive the reference signal according to the first-level parameter and the second-level parameter.

The number of time domain symbols configured in the reference signal resource is N, N1 is less than or equal to N, and N2 is less than or equal to N.

For a description of the apparatus provided in the embodiment, reference may be made to the embodiment corresponding to FIG. 3, and thus no further details are provided herein.

Figure 12:
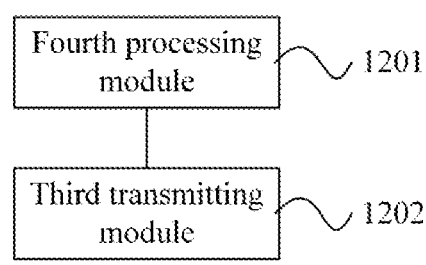
FIG. 12 is a schematic diagram of another information transmission apparatus according to an embodiment of the present application.

FIG. 12 is a schematic diagram of an information transmission apparatus according to an embodiment of the present application. As shown in FIG. 12, the embodiment provides an information transmission apparatus, applied to a second communication node, including a fourth processing module 1201 and a third transmitting module 1202.

The fourth processing module 1201 is configured to determine a first-level parameter and a second-level parameter of a reference signal resource, where the first-level parameter includes at least one of: the number N1 of time domain symbols continuously transmitted by a reference signal in a same frequency domain unit, an antenna switching switch function A1 of the reference signal, or a frequency hopping switch function B1; and the second-level parameter includes at least one of: the number N2 of time domain symbols continuously transmitted by an antenna port group of the reference signal, an antenna switching switch function A2 of the reference signal in a time domain unit, or a frequency hopping switch function B2 of the reference signal in a time domain unit.

The third transmitting module 1202 is configured to transmit the reference signal according to the first-level parameter and the second-level parameter.

The number of time domain symbols configured in the reference signal resource is N, N1 is less than or equal to N, and N2 is less than or equal to N.

For a description of the apparatus provided in the embodiment, reference may be made to the embodiment corresponding to FIG. 4, and thus no further details are provided herein.

Figure 13:
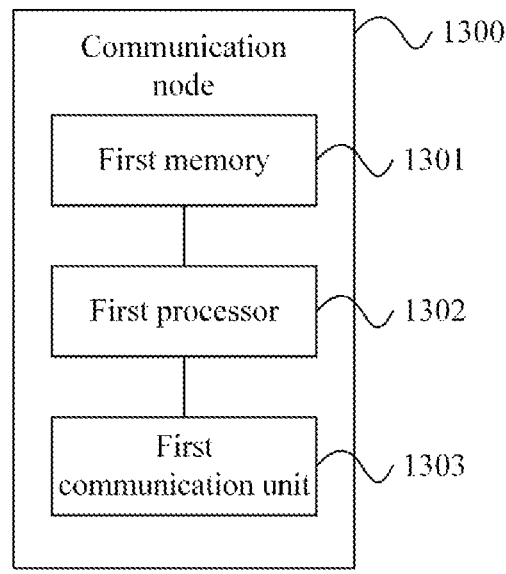
FIG. 13 is a schematic diagram of a communication node according to an embodiment of the present application.

FIG. 13 is a schematic diagram of a communication node according to an embodiment of the present application. As shown in FIG. 13, the embodiment provides a communication node 1300, such as a base station, including a first memory 1301 and a first processor 1302; and the first memory 1301 is configured to store information transmission programs which, when executed by the first processor 1302, implement the steps of the information transmission method illustrated in FIG. 1.

It should be understood by those skilled in the art that the communication node structure illustrated in FIG. 13 does not limit the communication node 1300, and the communication node 1300 may include more or fewer components than those illustrated, or may be configured by combining certain components or using different components.

The first processor 1302 may include, but is not limited to, a microcontroller unit (MCU), a field programmable gate array (FPGA) or another processing apparatus. The first memory 1301 may be configured to store software programs of application software, and modules, such as program instructions or modules corresponding to the information transmission method in the embodiment. The first processor 1302 executes the software programs and modules stored in the first memory 1301 to perform various functional applications and data processing, for example, to implement the information transmission method described in the embodiment. The first memory 1301 may include a high-speed random access memory, and may further include a nonvolatile memory, such as one or more magnetic storage apparatuses, flash memories or other nonvolatile solid-state memories. In some examples, the first memory 1301 may include memories which are remotely disposed relative to the first processor 1302 and these remote memories may be connected to the communication node 1300 via a network. Examples of such a network include, but are not limited to, the Internet, intranets, local area networks, mobile communication networks, and combinations thereof.

Exemplarily, the communication node 1300 described above may further include a first communication unit 1303; and the first communication unit 1303 may receive or transmit data via a network. In one example, the first communication unit 1303 may be a radio frequency (RF) module, which is configured to wirelessly communicate with the Internet.

Figure 14:
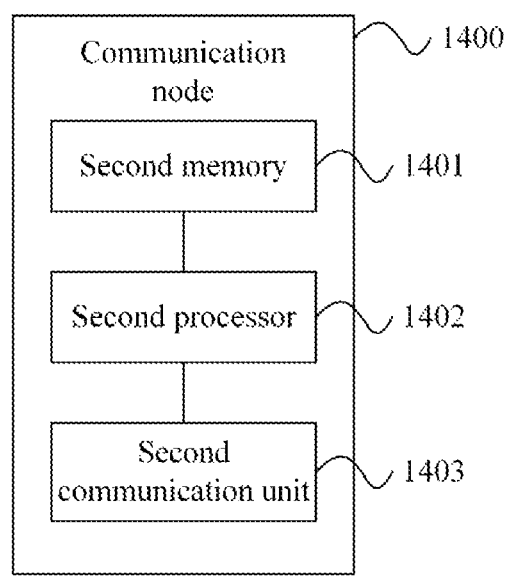
FIG. 14 is a schematic diagram of another communication node according to an embodiment of the present application.

FIG. 14 is a schematic diagram of a communication node according to an embodiment of the present application. As shown in FIG. 14, the embodiment provides a communication node 1400, such as a UE, including a second memory 1401 and a second processor 1402; and the second memory 1401 is configured to store information transmission programs which, when executed by the second processor 1402, implement the steps of the information transmission method illustrated in FIG. 2.

It should be understood by those skilled in the art that the communication node structure illustrated in FIG. 14 does not limit the communication node 1400, and the communication node 1400 may include more or fewer components than those illustrated, or may be configured by combining certain components or using different components.

Exemplarily, the communication node 1400 described above may further include a second communication unit 1403; and the second communication unit 1403 may receive or transmit data via a network.

For a description of the second memory, the second processor, and the second communication unit in the embodiment, reference may be made to the description of the first memory, the first processor, and the first communication unit, and thus no further details are provided herein.

An embodiment of the present application further provides a communication node, including: a third memory and a third processor, where the third memory is configured to store information transmission programs which, when executed by the third processor, implement the steps of the information transmission method illustrated in FIG. 3.

An embodiment of the present application further provides a communication node, including: a fourth memory and a fourth processor, where the fourth memory is configured to store information transmission programs which, when executed by the fourth processor, implement the steps of the information transmission method illustrated in FIG. 4.

For a description of the third memory, the third processor, the fourth memory and the fourth processor, reference may be made to the description of the first memory and the first processor, and thus no further details are provided herein.

In addition, an embodiment of the present application further provides a computer-readable medium, which is configured to store information transmission programs which, when executed by a processor, implement the steps of the information transmission method illustrated in FIG. 1, or 2, or 3, or 4.

It should be understood by those skilled in the art that functional modules or units in all or part of the steps of the method, the system and the apparatus disclosed above may be implemented as software, firmware, hardware and appropriate combinations thereof. In the hardware implementation, the division of functional modules or units mentioned in the above description may not correspond to the division of physical components. For example, one physical component may have multiple functions, or one function or step may be executed jointly by several physical components. Some or all components may be implemented as software executed by processors such as digital signal processors or microcontrollers, hardware, or integrated circuits such as application specific integrated circuits. Such software may be distributed on computer-readable media, which may include computer storage media (or non-transitory media) and communication media (or transitory media). As is known to those skilled in the art, the term, computer storage media, includes volatile and nonvolatile, removable and non-removable media implemented in any method or technology for storing information (such as computer-readable instructions, data structures, program modules or other data). The computer storage media include, but are not limited to, random access memory (RAM), read-only memory (ROM), electrically erasable programmable read-only memory (EEPROM), flash memory or other memory technologies, compact disc read-only memory (CD-ROM), digital versatile disc (DVD), or other optical disc storage, magnetic cassette, magnetic tape, magnetic disk storage or other magnetic storage devices, or any other media configured for storing desired information and accessible by the computer. In addition, as is known to those skilled in the art, communication media generally include computer-readable instructions, data structures, program modules or other data in modulated data signals such as carriers or other transmission mechanisms, and may include any information delivery medium.

Although the implementation modes disclosed by the present application are as described above, the content thereof is merely embodiments for facilitating the understanding of the present application and is not intended to limit the present application. Any person skilled in the art to which the present application pertains may make any modifications and changes in the forms and details of the implementation without departing from the spirit and scope disclosed by the present application, but the patent protection scope of the present application is still subject to the scope defined by the appended claims.

What is claimed is:

1. A wireless communication method, comprising:
 determining, by a first communication node, a first parameter indicating a bandwidth of a sounding reference signal, a second parameter indicating a bandwidth configuration of the sounding reference signal, and an offset value of a first frequency domain starting position of the sounding reference signal relative to a second frequency domain starting position,
 wherein the first frequency domain starting position is determined based on $\bar{k}_0^{(p)} = k_{TC}^{(p)} + \Delta_{offset}^{PRB} N_{sc}^{RB}$, wherein $\Delta_{offset}^{PRB}$ is the offset value of the first frequency domain starting position, $N_{sc}^{RB}$ is a number of subcarriers in a physical resource block, and $k_{TP}^{(p)}$ is the second frequency domain starting position, and
 wherein a transmission bandwidth set of the sounding reference signal is determined according to the second parameter indicating the bandwidth configuration of the sounding reference signal, the transmission bandwidth set comprising:
 112, 56, 28, 4;
 120, 60, 20, 4;
 128, 64, 32, 4;
 136, 68, 4, 4;
 144, 72, 36, 4;
 144, 48, 16, 4;
 160, 80, 40, 4;
 160, 80, 20, 4;
 168, 84, 28, 4;
 176, 88, 44, 4;
 192, 96, 48, 4;
 208, 104, 52, 4;
 216, 108, 36, 4;
 240, 120, 60, 4;
 240, 80, 20, 4;
 256, 128, 64, 4; and
 272, 136, 68, 4; and
 transmitting a signaling message to a second communication node, wherein the signaling message includes the first parameter, the second parameter, and the offset value.

2. The method of claim 1, wherein the second parameter indicating the bandwidth configuration of the sounding reference signal is an integer in a range from 0 to 63.

3. The method of claim 1, comprising:
 configuring a plurality of resources for the second communication node, wherein the signaling message includes a third parameter to allow the second communication node to switch antennas using the plurality of the resources.

4. A non-transitory storage medium having code stored thereon, the code upon execution by a processor, causing the processor to implement a method of claim 1.

5. The non-transitory storage medium of claim 4, wherein the second parameter indicating the bandwidth configuration of the sounding reference signal is an integer in a range from 0 to 63.

6. The non-transitory storage medium of claim 4, wherein the method further comprises:
 configuring a plurality of resources for the second communication node, wherein the signaling message includes a third parameter to allow the second communication node to switch antennas using the plurality of the resources.

7. A wireless communication method, comprising:
 receiving, by a second communication node, a signaling message transmitted by a first communication node, wherein the signaling message includes a first parameter indicating a bandwidth of a sounding reference signal, a second parameter indicating a bandwidth configuration of the sounding reference signal, and an offset value of a first frequency domain starting position of the sounding reference signal relative to a second frequency domain starting position, wherein the first frequency domain starting position is determined based on $\bar{k}_0^{(p)} = k_{TC}^{(p)} + \Delta_{offset}^{PRB} N_{sc}^{RB}$, and wherein $\Delta_{offset}^{PRB}$ is the offset value of the first frequency domain starting position, $N_{sc}^{RB}$ is a number of subcarriers in a physical resource block, and $k_{TC}^{(p)}$ is the second frequency domain starting position;
 determining, by the second communication node, a transmission bandwidth set of the sounding reference signal according to the second parameter indicating the bandwidth configuration of the sounding reference signal, wherein the transmission bandwidth set comprises:
112, 56, 28, 4;
120, 60, 20, 4;
128, 64, 32, 4;
136, 68, 4, 4;
144, 72, 36, 4;
144, 48, 16, 4;
160, 80, 40, 4;
160, 80, 20, 4;
168, 84, 28, 4;
176, 88, 44, 4;
192, 96, 48, 4;
208, 104, 52, 4;
216, 108, 36, 4;
240, 120, 60, 4;
240, 80, 20, 4;
256, 128, 64, 4; and
272, 136, 68, 4; and
determining, by the second communication node, a resource based on the first parameter, the second parameter indicating the transmission bandwidth set, and the offset value included in the signaling message;
transmitting, by the second communication node, the sounding reference signal using the resource.

8. The method of claim 7, wherein the second parameter indicating the bandwidth configuration of the sounding reference signal is an integer in a range from 0 to 63.

9. The method of claim 7, comprising:
switching, by the second communication node, antennas using a plurality of resources configured by the first communication node.

10. A non-transitory storage medium having code stored thereon, the code upon execution by a processor, causing the processor to implement a method of claim 7.

11. The non-transitory storage medium of claim 10, wherein the second parameter indicating the bandwidth configuration of the sounding reference signal is an integer in a range from 0 to 63.

12. The non-transitory storage medium of claim 10, wherein the method further comprises:
switching, by the second communication node, antennas using a plurality of resources configured by the first communication node.

13. A wireless communication device, comprising:
a processor, and
a memory including processor executable code, wherein the processor executable code upon execution by the processor configures the processor to:
determine a first parameter indicating a bandwidth of a sounding reference signal, a second parameter indicating a bandwidth configuration of the sounding reference signal, and an offset value of a first frequency domain starting position of the sounding reference signal relative to a second frequency domain starting position, wherein the first frequency domain starting position is determined based on $\bar{k}_0^{(p)}=k_{TC}^{(p)}+\Delta_{offset}^{PRB}N_{sc}^{RB}$, wherein $\Delta_{offset}^{PRB}$ is the offset value of the first frequency domain starting position, $N_{sc}^{RB}$ is a number of subcarriers in a physical resource block, and $k_{TC}^{(p)}$ is the second frequency domain starting position; and wherein a transmission bandwidth set of the sounding reference signal is determined according to the second parameter indicating the bandwidth configuration of the sounding reference signal, the transmission bandwidth set comprising:
112, 56, 28, 4;
120, 60, 20, 4;
128, 64, 32, 4;
136, 68, 4, 4;
144, 72, 36, 4;
144, 48, 16, 4;
160, 80, 40, 4;
160, 80, 20, 4;
168, 84, 28, 4;
176, 88, 44, 4;
192, 96, 48, 4;
208, 104, 52, 4;
216, 108, 36, 4;
240, 120, 60, 4;
240, 80, 20, 4;
256, 128, 64, 4; and
272, 136, 68, 4; and
transmit a signaling message to a second communication node, wherein the signaling message includes the first parameter, the second parameter, and the offset value.

14. The device of claim 13, wherein the second parameter indicating the bandwidth configuration of the sounding reference signal is an integer in a range from 0 to 63.

15. The device of claim 13, wherein the processor executable code upon execution by the processor configures the processor to:
configure a plurality of resources for the second communication node, wherein the signaling message includes a third parameter to allow the second communication node to switch antennas using the plurality of the resources.

16. A wireless communication device, comprising:
a processor, and
a memory including processor executable code, wherein the processor executable code upon execution by the processor configures the processor to:
receive a signaling message transmitted by a first communication node, wherein the signaling message includes a first parameter indicating a bandwidth of a sounding reference signal, a second parameter indicating a bandwidth configuration of the sounding reference signal, and an offset value of a first frequency domain starting position of the sounding reference signal relative to a second frequency domain starting position, wherein the first frequency domain starting position is determined based on $\bar{k}_0^{(p)}=k_{TC}^{(p)}+\Delta_{offset}^{PRB}N_{sc}^{RB}$, and wherein $\Delta_{offset}^{PRB}$ is the offset value of the first frequency domain starting position, $N_{sc}^{RB}$ is a number of subcarriers in a physical resource block, and $k_{TC}^{(p)}$ is the second frequency domain starting position;
determine a transmission bandwidth set of the sounding reference signal according to the second parameter indicating the bandwidth configuration of the sounding reference signal, wherein the transmission bandwidth set comprises:
112, 56, 28, 4;
120, 60, 20, 4;
128, 64, 32, 4;
136, 68, 4, 4;
144, 72, 36, 4;
144, 48, 16, 4;
160, 80, 40, 4;
160, 80, 20, 4;
168, 84, 28, 4;
176, 88, 44, 4;
192, 96, 48, 4;

208, 104, 52, 4;
216, 108, 36, 4;
240, 120, 60, 4;
240, 80, 20, 4;
256, 128, 64, 4; and
272, 136, 68, determine a resource based on the first parameter, the second parameter indicating the transmission bandwidth set, and the offset value included in the signaling message; and transmit the sounding reference signal using the resource.

17. The device of claim 16, wherein the second parameter indicating the bandwidth configuration of the sounding reference signal is an integer in a range from 0 to 63.

18. The device of claim 16, wherein the processor executable code upon execution by the processor configures the processor to switch antennas using a plurality of resources configured by the first communication node.

* * * * *